United States Patent
Simms et al.

[11] 3,716,506
[45] *Feb. 13, 1973

[54] PROCESS FOR PREPARING AZIRIDINYL ALKYL-ACRYLATE OR METHACRYLATE GRAFT COPOLYMERS

[75] Inventors: John A. Simms, Wilmington, Del.; Aloysius N. Walus, Flint, Mich.

[73] Assignee: E. I. du Pont de Nemours and Company, Wilmington, Del.

[ * ] Notice: The portion of the term of this patent subsequent to March 21, 1989, has been disclaimed.

[22] Filed: Dec. 22, 1970

[21] Appl. No.: 100,793

[52] U.S. Cl. ......260/22 CB, 117/132 B, 117/132 BE, 117/161 K, 117/161 ZB, 117/161 UZ, 117/161 UC, 260/837 R, 260/859 R, 260/873, 260/875, 260/882, 260/883, 260/885
[51] Int. Cl. .........................C08f 45/34, C08f 45/36
[58] Field of Search....260/2 EN, 22 CB, 873, 837 R, 260/875, 883, 885, 827, 859 R, 882

[56] References Cited

UNITED STATES PATENTS

| | | | |
|---|---|---|---|
| 3,651,005 | 3/1972 | Walus | 260/31.2 |
| 3,280,218 | 10/1966 | Endsley et al. | 260/2 |
| 3,355,437 | 11/1967 | Tesoro et al. | 260/2 |
| 2,882,259 | 4/1959 | Graham | 260/874 |
| 2,915,480 | 12/1959 | Reeves et al. | 260/2 |
| 3,232,903 | 2/1966 | Schmidle et al. | 260/33.6 |
| 3,262,991 | 7/1966 | McClendon et al. | 260/823 |
| 3,291,859 | 12/1966 | Tobolsky | 260/859 |
| 3,317,635 | 5/1967 | Osmond | 260/881 |
| 3,338,885 | 8/1967 | Coker et al. | 260/239 |
| 3,480,601 | 11/1969 | Ashby et al. | 260/86.1 |
| 3,507,814 | 4/1970 | Uelzmann | 260/2 |
| 3,511,897 | 5/1970 | Endsley | 260/878 |
| 3,573,278 | 3/1971 | Uelzmann | 260/2 |

*Primary Examiner*—Donald E. Czaja
*Assistant Examiner*—Ronald W. Griffin
*Attorney*—Hilmar L. Fricke

[57] ABSTRACT

The novel process for preparing a graft copolymer having a backbone segment and side chain segments comprises:
1. preparing a prepolymer which forms a side chain segment of the graft copolymer that contains at least one reactive group;
2. reacting the prepolymer and aziridinyl compound of the formula

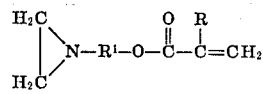

wherein $R^1$ is an alkylene group having 1–8 carbon atoms and R is —H or —$CH_3$;
3. polymerizing the prepolymer with other ethylenically unsaturated monomer units to form that graft copolymer.

These graft copolymers are particularly useful in forming coating compositions which may be in the form of aqueous dispersions, organosols or lacquers and these compositions form useful finishes for trucks, automobiles, airplanes, appliances such as refrigerators, stoves, washing machines, and the like and can be used as primers and/or sealer compositions.

12 Claims, No Drawings

PROCESS FOR PREPARING AZIRIDINYL ALKYL-ACRYLATE OR METHACRYLATE GRAFT COPOLYMERS

BACKGROUND OF THE INVENTION

The process of this invention relates to the preparation of graft copolymers and in particular in preparation of graft copolymers by utilizing an aziridinyl compound as the grafting mechanism.

Processes for preparing graft copolymers are well known in the art as shown by Schmidle et al. in U.S. Pat. No. 3,232,903, issued Feb. 1, 1966, and Osmond et al., U.S. Pat. No. 3,317,635 issued May 2, 1967. However, these prior art processes are not efficient in producing high yields of graft copolymers and many of these processes result in the production of a mixture of large amounts of homopolymers and copolymers with the graft copolymers. There is a great need in the coating industry today for an efficient process for the production of high quality graft copolymers.

Aziridinyl alkyl acrylates or methacrylates have been utilized in the preparation of copolymers as shown in Ashby et al., U.S. Pat. No. 3,480,601, issued Nov. 25, 1969. However, the preparation of graft copolymers is not taught therein. The novel process of this invention utilizes aziridinyl alkyl acrylate or methacrylate as the coupling unit to prepare in high yields high quality graft copolymers. By utilizing the process of this invention, the formation of unwanted copolymers and homopolymers in the graft polymerization process is substantially reduced and often eliminated.

SUMMARY OF THE INVENTION

The process of this invention for forming graft copolymers having a backbone segment and side chain segments comprises the following steps:

1. preparing a prepolymer which forms side chain segments of the graft copolymer by polymerizing monomer units to form a prepolymer that has a number average molecular weight of about 500–150,000 and contains at least one reactive group having acid characteristics and that yields a hydrogen ion;

2. reacting said prepolymer with an aziridinyl compound of the formula

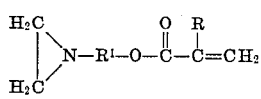

wherein the reactive group of the prepolymer reacts with the aziridinyl ring to form a prepolymer having an ethylenically unsaturated site and wherein —R is either —H or —CH$_3$ and R$^1$ is an alkylene group having one to eight carbon atoms;

3. polymerizing the prepolymer formed in step (2) with ethylenically unsaturated monomer units to form the graft copolymer having a number average molecular weight of about 5,000–200,000; wherein the polymerized ethylenically unsaturated monomer units form the backbone segment of the graft copolymer and the side chains of the graft copolymer are coupled into the backbone segment through the polymerization of the ethylenically unsaturated site.

DESCRIPTION OF THE INVENTION

In the novel process of this invention for preparing a graft copolymer, a prepolymer is first formed which is the side chain segment of the graft copolymer. Conventional polymerization techniques are used to prepare the prepolymer and the resulting prepolymer has a number average molecular weight of about 500—150,000 and contains at least one reactive group having acid characteristics and that will yield a hydrogen ion in a subsequent reaction. The aziridinyl compound reacts with the reactive group of the prepolymers and the resulting product polymerizes with the backbone monomer units to form the graft copolymer. The aziridinyl compound is the coupling unit which couples the prepolymer to the backbone of the polymer. The resulting graft copolymer has a number average molecular weight of about 5,000—200,000; preferably, polymers are prepared that have a number average molecular weight of about 30,000—150,000.

The prepolymer is prepared by conventional polymerization techniques in which the monomer constituents are blended with the solvent and a polymerization catalyst and heated to about 50°—200° C. for about 0.5–6 hours to form a prepolymer.

Typical solvents and diluents which are used to prepare this prepolymer for example, toluene, xylene, butylacetate, acetone, methyl isobutyl ketone, methyl ethyl ketone, butyl alcohol, hexane, cellosolve, cellosolve acetate and other aliphatic, cycloaliphatic and aromatic hydrocarbons, esters, ethers, ketones and alcohols.

About 0.1—4 percent by weight, based on the weight of the monomers used to prepare the prepolymer, of a polymerization catalyst is used in the preparation of the prepolymer. For the polymerization of ethylenically unsaturated monomers, typical catalysts are ditertiary butyl peroxide, cumene hydroperoxide, azo-bis-isobutyronitrile and the like. Typical esterification catalysts that can be used for alkyd resins, epoxy resins, polyesters are, for example, sulfonic acid, organo-tin compounds such as dibutyl tin dilaurate, dibutyl tin oxide; litharge, titanium complexes, aromatic ammonium hydroxide compounds, for example, benzyltrimethylammonium hydroxide.

A large variety of prepolymers can be utilized according to the novel process of this invention to prepare graft copolymers such as acrylic polymers, epoxy ester resins, polyesters, alkyd resins, other vinyl addition polymers such as polyethylene, polypropylene, polybutylene, polychloroprene, ethylene vinyl acetate, polyvinyl chloride, polyvinyledine chloride, polystyrene, copolymers of styrene, or other fluorocarbon polymers such as polytetrafluoroethylene, polyamides, polyimides, polyamide-imides, polyurethanes, chain extended polyurethanes, and the like. It is important that the prepolymer contain at least one reactive group having acid characteristics and that will yield a hydrogen ion so that the prepolymer will react with the aziridinyl compound to form a prepolymer having an ethylenically unsaturated site which will polymerize with the backbone monomers according to the novel process of this invention to form a graft copolymer.

The following are typical reactive groups attached to the prepolymer that have these acid characteristics:

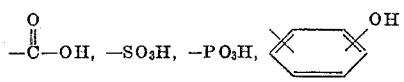

Typical substituents that can be used in the prepolymer to provide these groups are for example, α,β-unsaturated carboxylic acids, drying oil fatty acids, non drying oil fatty acids, dicarboxylic aromatic, aliphatic or cycloaliphatic acids; sulfoalkyl methacrylates or acrylates, such as sulfoethyl methacrylate or acrylate, bisphenol A, bisphenol F, the reaction product of phosphoric acid and glycidyl methacrylate or acrylate and the like.

The technique that provides a high quality graft copolymer is to neutralize one of the reactive acid groups of the prepolymer with a basic compound and then react this prepolymer with the aziridinyl compound. The molar ratio of basic compound to acid equivalent of prepolymer to aziridinyl compound is maintained at 1:1:1. Typical basic compounds that can be used volatilize below 100° C. and are, for example, ammonia, ammonium hydroxide, primary amines, secondary amines, tertiary amines and polyamines, such as diethylene, triethylamine, and the like.

In one preferred embodiment of the novel process of this invention, one carboxylic group is utilized per prepolymer chain. The carboxyl group is neutralized with a basic compound, then reacted with the aziridinyl compound and then polymerized to form the graft copolymer. This technique leaves no residual acid in the resulting graft copolymer. This technique can be used when the prepolymer is prepared from ethylenically unsaturated monomers since a compound such as azocyanopentanoic acid can be used as a polymerization initiator and under selected reaction conditions so that each resulting prepolymer chain only contains one carboxyl group per chain.

The graft copolymer is prepared by blending the prepolymer which has been reacted with aziridinyl compound with the backbone monomer units and then polymerizing the ingredients preferably at about 75°—260°C. for about 2—6 hours to form the graft copolymer. Any of the aforementioned polymerization catalysts utilized for ethylenically unsaturated monomers may be added along with additional solvents to prepare the graft copolymer.

Another closely related process that can be used to prepare the graft copolymer is to prepare a prepolymer according to the procedure indicated above that has only one reactive group per chain of prepolymer. The ethylenically unsaturated monomer units that form the backbone of the graft copolymer are polymerized with the aziridinyl compound to form a polymer segment having pendent aziridinyl groups. The aziridinyl group of the polymer segment are then reacted with the reactive group of the prepolymer to form the graft copolymer. Azocyanopentanoic acid can be used to prepare a prepolymer of ethylenically unsaturated monomers and provide a prepolymer with one reactive carboxyl group on the prepolymer chain. As indicated above, the acid group on the prepolymer chain can be neutralized with a basic compound and then reacted with the aziridinyl group to form a high quality graft copolymer.

The ethylenically unsaturated monomer units utilized in the process to prepare the backbone of the graft copolymer are, for example, ethylene, propylene, butylene, ethylene-vinyl acetate, vinyl chloride, vinylidene chloride, tetrafluoroethylene, fluorinated ethylene-propylene, styrene, styrene/butadiene, acrylonitrile, acrylamide, alkyl esters of acrylic and methacrylic acid in which the alkyl group has one to 24 carbon atoms and the like.

The aziridinyl compound utilized in the novel process of this invention to form the graft copolymer has the formula

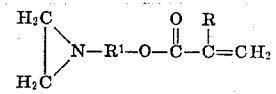

where —R is —H or —CH$_3$ and R$^1$ is an alkylene group having one to eight atoms. Typical aziridinyl compounds of this type are aziridinyl alkyl acrylates or methacrylates, such as 2-(1-aziridinyl) ethyl acrylate, 3-(1-aziridinyl) propyl acrylate, 4-(1-aziridinyl) butyl acrylate, 6-(1-aziridinyl) hexyl acrylate, 8-(1-axiridinyl) octyl acrylate, 2-(1-aziridinyl) ethyl methacrylate, 3-(1-aziridinyl) propyl methacrylate, 4-(1-aziridinyl) hexyl methacrylate, 6-(1-aziridinyl) hexyl methacrylate, 8-(1-aziridinyl) octyl methacrylate. One particularly preferred compound is 2-(1-aziridinyl) ethyl methacrylate since it forms graft copolymers of high quality.

The novel process of this invention is used to prepare a graft copolymer useful in a lacquer coating composition. The lacquer coating composition comprises a solution of 10–50 percent by weight of a film-forming polymer dissolved in an organic solvent, in which the film-forming polymer has a number average molecular weight of about 20,000—200,000 and is a graft copolymer prepared according to the process of this invention having a soft polymeric backbone segment and hard polymer side chain segments, wherein the polymeric backbone segment comprises 10–50 percent by weight of the copolymer and consists essentially of soft polymerized monomer units which can be either an alkyl acrylate, an alkyl methacrylate or mixtures thereof, wherein the alkyl groups have four to 24 carbon atoms; and the polymer side chain segments comprise about 90–50 percent by weight of the copolymer and are grafted into the polymer backbone segment through a coupling unit of an aziridinyl compound that is polymerized into the backbone and that has the formula

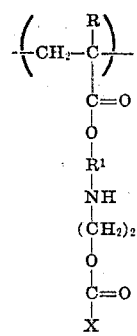

wherein —R is either —H or —CH$_3$; R$^1$ is an alkylene group having one to eight carbon atoms; X is a hard polymer segment that has a number average molecular weight of 5,000–150,000 and consists essentially of polymerized units selected from the group consisting of alkyl acrylate, alkyl methacrylate, acrylonitrile, methacrylonitrile or mixtures thereof wherein the alkyl groups have one to three carbon atoms.

Preferably graft copolymers are used in the lacquer composition that contain 15–25 percent by weight of backbone segment, and correspondingly, 85–75 percent of the side chain segment and have a molecular weight of about 30,000–130,000.

Preferably, the coating composition contains about 15–30 percent by weight of the graft copolymer dissolved in an organic solvent. This particular lacquer composition has excellent physical properties, such as increased solvent craze resistance, water spot resistance, resistance to deterioration from weathering, chip resistance, scratch and mar resistance, excellent gloss and buffability. These characteristics make the lacquer particularly suitable for high quality finish for automobiles and trucks.

One preferred process for preparing the graft copolymer utilized in the lacquer is to form a prepolymer that contains about 0.1–20 percent by weight of an α,β-unsaturated carboxylic acid. The free carboxyl reacts with the aziridinyl group of the aziridinyl compound. The ethylenically unsaturated portion of the aziridinyl compound reacts with the backbone monomer units to form the graft copolymer. Preferably, 1 mole of the aziridinyl compound is used per mole of prepolymer to form a high quality graft copolymer. Generally, the graft copolymer contains residual unreacted carboxylic acids. The amount of residual acid may be about 0.1–5 percent by weight of the resulting graft copolymer polymer. Typically useful α,β-ethylenically unsaturated carboxylic acids used to prepare this prepolymer are acrylic acid, methacrylic acid, crotonic acid, ethacrylic acid, itaconic acid and the like. Acrylic acid and methacrylic acid are preferred.

The above described technique that provides a high quality graft copolymer useful for lacquers is to neutralize one of the carboxyl groups of the prepolymer with a basic compound and then react this prepolymer with the aziridinyl compound. Also, it may be desirable to utilize only one carboxylic group per prepolymer chain, neutralize this carboxyl group with a basic compound and react this prepolymer with an aziridinyl compound to form the graft copolymer. This technique leaves no residual acid in the resulting graft copolymer and can be accomplished by using azocyanopentenoic acid for preparing the prepolymer.

Typical monomer units which are used in the novel process of this invention to form the hard prepolymer of the graft copolymer used for lacquers are alkyl acrylates and methacrylates in which the alkyl group has one to three carbon atoms, such as methyl methacrylate, propyl methacrylate, ethyl acrylate, propyl acrylate, acrylonitrile and methacrylonitrile. The monomers should be selected to provide the hard side chain segment preferably with a glass transition temperature of at least 60° C. and up to 110° C.

The following are typically useful soft constituents used to form the backbone of the graft copolymer used for lacquers: alkyl acrylates and alkyl methacrylates in which the alkyl group has four to twenty-four carbon atoms, preferably four to twelve carbon atoms, for example, butyl acrylate, hexyl acrylate, 2-ethyl-hexyl acrylate, nonyl acrylate, lauryl acrylate, stearyl acrylate, butyl methacrylate, isobutyl methacrylate, hexyl methacrylate, 2-ethylhexyl methacrylate, octyl methacrylate, nonyl methacrylate, lauryl methacrylate, stearyl methacrylate and the like. The monomers for the backbone segment should be selected to provide a soft backbone segment preferably with a glass transition temperature of 20° C. to as low as −100° C. Small amounts of any of the above monomers used for the side chain can be used in the backbone provided that the glass transition temperature remains within the above range.

The graft copolymers prepared according to the process of this invention and used to prepare lacquer compositions optionally can contain up to 20 percent by weight of the backbone segment of adhesion promoting acrylic monomers. Typical adhesion promoting monomers that can be used are aminohydroxy alkyl methacrylates and acrylates, such as aminohydroxy propyl methacrylate, aminohydroxy propyl acrylate, and the like; aminoalkyl methacrylates or acrylates, such as aminopropyl methacrylate, aminoethyl methacrylate, aminoethyl acrylate; ethylenically polymerizable oxazolidine compounds, such as 3-(2-methacryloxyethyl)-2,2-spirocylohexyl oxazolidine.

The novel process of this invention can be used to prepare graft copolymers useful in organosol coating compositions. The organosol coating compositions comprise 5–70 percent by weight of a film-forming polymer uniformly dispersed in an organic liquid in which the film-forming polymer has a number average molecular weight of about 20,000–200,000 and consists essentially of a graft copolymer prepared according to the process of this invention having a hard insoluble polymeric backbone segment and a soft soluble polymeric side chain segment; wherein 1 the polymeric backbone segment of the copolymer insoluble insoluble in the organic liquid and has a glass transition temperature of at least 60° C. and comprises about 95–70 percent by weight of the copolymer and consists essentially of polymerized units selected from the following group: alkyl methacrylate, alkyl acrylate, acrylonitrile, methacrylonitrile, styrene, and mixtures thereof wherein the alkyl groups have one to four carbon atoms;

2. the polymer side chain segments of the copolymer are soluble in the organic liquid and have a glass transition temperature below 20° C. and comprises 5–30 percent by weight of the copolymer and are grafted onto the backbone segment of the copolymer through aziridinyl coupling units that are polymerized into the backbone wherein the coupling unit has the formula

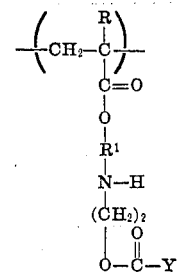

wherein —R is either —H or —$CH_3$; $R^1$ is an alkylene group having one to eight carbon atoms; Y is a polymer segment chemically different from the backbone segment and has a molecular weight of about 1,000 to 15,000 and a glass transition temperature of less than 20° C. and consists essentially of polymerized units selected from the following group: an alkyl acrylate, alkyl methacrylate, or a mixture thereof having two to 24 carbon atoms in each of the alkyl groups;

the organic liquid comprises a solvent blend containing at least one non-solvent for the graft copolymer backbone segment and at least one solvent for the side chain segment of the copolymer.

Preferably, graft copolymers are used in the organosol composition that have a molecular weight of 30,000–100,000 and preferably, contains 80–92 percent by weight of the backbone segment and correspondingly, 20–8 percent by weight of side chain segments.

Preferably, the solids content of the organosol composition is 30–60 percent by weight. By utilizing an organosol composition, coatings can be applied which have a substantially higher polymer solids content and uniform and even coverage can be obtained with the use of only two coats whereas conventional coating compositions, such as lacquers and enamels, require three or more coats to cover the substrate. The has particular cost saving advantages in the automobile and truck manufacturing industry in the reduction of application coats and also has the added advantage of reduction of air pollution since less solvent is utilized in these organosol compositions. Also, non-aromatic solvents that are considered non-air polluting solvents can be utilized in this composition.

One preferred process for preparing the graft copolymer for organosol compositions is to form a prepolymer that contains about 1–30 percent by weight of an $\alpha,\beta$-unsaturated carboxylic acid. The free carboxyl of the prepolymer reacts with the aziridinyl group of the aziridinyl compound and forms a prepolymer with one site of ethylenically unsaturation. This ethylenically unsaturated backbone monomer units to form the graft copolymer. Generally, the graft copolymer contains residual unreacted carboxylic acid. The amount of residual acid may be about 0.1–5 percent by weight, based on the weight of the graft copolymer. Typically useful $\alpha,\beta$-ethylenically unsaturated carboxylic acids used to prepare this prepolymer are acrylic acid, methacrylic acid, crotonic acid, ethacrylic acid, itaconic acid and the like. Acrylic acid and methacrylic acid are preferred.

The monomers selected for use in the novel process of this invention for the prepolymer of the graft copolymer of the above organosol should provide a prepolymer that is relatively soft and soluble in solvents and that has a glass transition temperature of below 20° C. and as low as −100° C. The alkyl acrylates and methacrylates which are used to form this prepolymer contain two to 24 carbon atoms in the alkyl group and preferably, two to 24 carbon atoms in the alkyl group and, are for example, ethyl acrylate, propyl acrylate, butyl acrylate, hexyl acrylate, 2-ethylhexyl acrylate, lauryl acrylate, stearyl acrylate, ethyl methacrylate, propyl methacrylate, butyl methacrylate, isobutyl methacrylate, hexyl methacrylate, 2-ethylhexyl methacrylate, octyl methacrylate, nonyl methacrylate, lauryl methacrylate, stearyl methacrylate and the like. Up to about 25 percent by weight, based on the weight of the prepolymer, of methyl methacrylate can be used with the aforementioned monomers provided that the glass transition temperature of the side chain remains below 20° C.

The monomer selected for use in the novel process of this invention for the backbone of the graft copolymer used in the organosols should provide a hard backbone segment that is insoluble in many solvents and that has a glass transition temperature of at least 60° C. to about 110° C. Typical monomer units which are used to form the backbone of the polymer are alkyl methacrylates, having one to four carbon atoms in the alkyl group, such as methyl methacrylate, propyl methacrylate, butyl methacrylate; acrylonitrile, methacrylonitrile, styrene and mixtures thereof. Small amounts of the aforementioned monomers used for the side chain can be utilized in the backbone segment provided the glass transition temperature of the backbone segment does not decrease below 60° C. The backbone segment of the graft copolymer must be chemically different from the side chain segment to provide a graft copolymer with soluble side chain segments that can be formed into an organosol coating composition.

In the above graft copolymer used for an organosol, optionally, up to 20 percent by weight, based on the weight of the backbone of the graft copolymer, of any of the aforementioned acrylic adhesion promoting units can be added to the hard backbone segment provided that the glass transition temperature of the segment remains within the 60° to 110° C. range.

The novel process of this invention can be used to prepare graft copolymers useful in coating compositions of aqueous dispersions. The aqueous polymeric coating compositions comprise 5–50 percent by weight of a uniformly dispersed film-forming polymer in an aqueous liquid containing up to 45 percent be weight, based one the weight of the liquid, of a water miscible solvent for the polymer; wherein the film-forming polymer has a number average molecular weight of 20,000–200,000 and consists essentially of a graft copolymer having a backbone segment and a polymeric side chain segment wherein 1. the polymeric backbone segment of the polymer comprises 70–95 percent by weight, based on the weight of the copolymer, and consists essentially of polymerized monomer units of methyl methacrylate, butyl methacrylate, acrylonitrile and mixtures thereof; and correspondingly, 2. the polymeric side chain segments comprises 30–5 percent by weight of the copolymer and are grafted into the backbone segment of the copolymer through a coupling unit that is polymerized to the backbone that has the formula

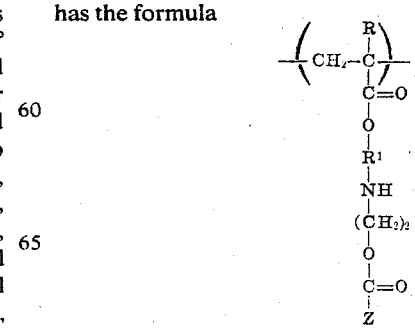

wherein —R is either —H or —CH₃; R¹ is an alkylene group having one to eight carbon atoms; Z is a polymer segment that has a number average molecular weight of 3,000–15,000 and consists essentially of 30–70 percent by weight, based on the weight of the polymeric side chain segment, of polymerized units of an α,β-ethylenically unsaturated carboxylic acid, and correspondingly, 70–30 percent by weight, based on the weight of the polymeric side chain segment, of polymerized units of alkyl acrylate, alkyl methacrylate, styrene, hydroxy alkyl acrylate, hydroxy alkyl methacrylate, and mixtures thereof, wherein the alkyl groups contain one to three carbon atoms.

Preferably, copolymers are utilized in the coating composition which have a molecular weight of 30,000–100,000 and contain 75–90 percent by weight of the backbone segment, and correspondingly, 25–10 percent by weight of the side chain segments. Preferably, the solids content of the aqueous composition is 30–60 percent by weight. By utilizing the dispersion, coatings can be applied which have a substantially higher polymer solids content than conventional lacquers and enamels and uniform and even coverage can be obtained with the use of only two coats which has not been possible with conventional solution type coating compositions. This has a cost saving advantage in the automobile and truck manufacturing industry and reduces air pollution to a substantial extent since very little or no solvent is used in the coating composition.

The prepolymer used in the novel process of this invention to prepare graft copolymers useful in dispersions contains about 30–70 percent by weight, based on the weight of the prepolymer, of polymerized units of an α,β-ethylenically unsaturated monovinylene carboxylic acid. Typically useful unsaturated monocarboxylic acids used to prepare this prepolymer are, for example, acrylic acid, methacrylic acid, crotonic acid, itaconic acid, ethylacrylic acid and the like. Acrylic acid and methacrylic acid are preferred.

Correspondingly, about 70–30 percent by weight, based on the weight of the prepolymer, is of polymerized units of alkyl acrylates, alkyl methacrylates, styrene, hydroxy alkyl acrylates or methacrylates, wherein the alkyl groups have one to three carbon atoms. Typical monomer units are, for example, methyl methactylate, propyl methacrylate, ethyl acrylate, propyl acrylate, hydroxy ethyl methacrylate, hydroxy propyl methacrylate, and the like.

Typical monomer units used in the novel process of this invention to form the backbone of the graft copolymer used in dispersions are methyl methacrylate, butyl methacrylate, acrylonitrile and mixtures of these monomers. Optionally, up to 15 percent by weight, based on the weight of the backbone of the graft copolymer, of acrylic adhesion promoting units can be added to the backbone segment. Typical adhesion promoting monomers are any of those mentioned above.

The novel process of this invention can be used to prepare acrylic-alkyd resin graft copolymers useful for coating compositions. These coating compositions comprise a solution of 10–50 percent by weight of a film-forming polymer dissolved in an organic solvent, in which the film-forming polymer has a number average molecular weight of about 5,000–150,000 and is a graft copolymer having a polymeric backbone segment and a polymeric side chain segment; wherein 1. the polymeric backbone segment comprises about 40–90 percent by weight of the copolymer and is of polymerized monomer units which can be either an alkyl acrylate, alkyl methacrylate, styrene, acrylonitrile, methacrylonitrile or mixtures thereof, in which the aforementioned alkyl groups have one to four carbon atoms;

2. the polymeric side chain segments comprise 10–60 percent by weight of the copolymer and are grafted into the polymer backbone segment through an aziridinyl coupling unit that is polymerized into the backbone that has the formula

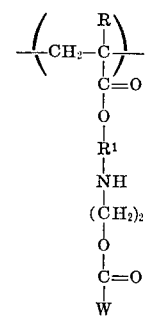

wherein —R is either —H or —CH₃; R¹ is an alkylene group of one to eight carbon atoms; and W is a polymer segment having a molecular weight of about 1,000–10,000 and consists essentially of an alkyd resin.

Preferably, graft copolymers are utilized in the above coating compositions that have a number average molecular weight of about 10,000–50,000 and that contain 60–80 percent by weight of the backbone segment and 20–40 percent by weight of the side chain segment.

The coating composition is a solution that contains preferably about 15–30 percent by weight of the film-forming graft copolymer and 0.1–20 percent by weight pigment. This particular composition has excellent physical properties without the use of an external plasticizer, such as good adhesion to bare metal substrates, chip resistance, crack and mar resistance and resistance to weathering. The composition can be used a primary coating for bare metal substrates or as a sealer composition. Sealer compositions are applied over a primed surface and provide a finish to which acrylic lacquers or enamel topcoats can be applied. Also, the compositions can be used as a primary coating for trucks and automobiles and for appliances such as refrigerators, stoves, washers, dryers and the like. Moreover, the novel coating composition of this invention can be used in the repair of coatings of automobiles and trucks.

The alkyd resin prepolymer used in the novel process of this invention to prepare the acrylic-alkyd resin graft copolymer basically consists of 10–60 percent by weight of a fatty acid which is either drying oil fatty acid or a non-drying oil fatty acid, 10–30 percent by weight of a polyhydric alcohol, and 10–30 percent by weight of a polycarboxylic acid or an anhydride of a polycarboxylic acid or a mixture of the acid and anhydride.

Typical drying oil fatty acids which are used to prepare the alkyd resin are tung oil fatty acids, linseed oil fatty acids, dehydrated castor oil fatty acids; soyabean oil fatty acids, tall oil fatty acids, and the like. Typical non-drying oil fatty acids which can be utilized are cottonseed oil fatty acids, peanut oil fatty acids, olive oil fatty acids, castor oil fatty acids and coconut oil fatty acids.

The polyhydric alcohol utilized in preparing the alkyd resin prepolymer can be a polyol containing three to 10 hydroxyl groups and having a molecular weight of about 90–1,000 or a diol or a blend of a polyol and a diol.

Typical polyols which can be used to form the alkyd resin are of the formula $$R^2{}_mC(CH_2OH)_n$$

wherein $R^2$ is either hydrogen, OH, or an alkyl group having one to three carbon atoms, and wherein $n$ and $m$ are integers and $n$ can be 2 to 4 and $m$ can be 0 to 2. Typical polyols of this type are trimethylol propane, trimethylol ethane, pentaerythritol, dipentaerythritol and glycerin.

Other polyols that can be used to form the alkyd resin are sorbitol, mannitol, $\alpha$-methylglucoside and hexane triol. Resinous polyols can also be used such as a reaction product of styrene and allyl alcohol.

Diols can be utilized to form the alkyd resin of the general formula HO—$R^3$—OH, wherein $R^3$ is an aliphatic group or an alicyclic group. Typical diols that can be used are, for example, ethylene glycol, propylene glycol, diethylene glycol, dipropylene glycol, butane diol, pentane diol, decamethylene glycol, neopentyl glycol, 1,4-cyclohexane dimethanol.

The polycarboxylic acid constituent used to prepare the alkyd resin can be any of the following aromatic dicarboxylic acids, aliphatic dicarboxylic acids, alicyclic dicarboxylic acids or the anhydrides of any of these acids:

saturated aliphatic dicarboxylic acids, such as succinic, glutaric, adipic, pimelic, suberic, azelaic, brassic, dodecanedoic and the like;

alicyclic dicarboxylic acids, such as hexahydroisophthalic acid, hexahydroterephthalic acid, tetrahydroisophthalic acid, tetrahydroterephthalic acid, hexahydrophthalic acid, tetrahydrophthalic acid;

aromatic dicarboxylic acids, such as phthalic, isophthalic terephthalic acid, and the like;

naphthalene dicarboxylic acid;
bibenzoic dicarboxylic acid;
isopropylidene dibenzoic acid;
methylene dibenzoic acid;
hexafluoroisopropylidene dibenzoic acid;
ketodibenzoic acid;
oxydibenzoic acid;
thiodibenzoic acid;
sulfonedibenzoic acid.

Tricarboxylic acids or their anhydrides can also be used as a polycarboxylic acid constituent for the alkyd resin prepolymer such as trimellitic acid and trimellitic anhydride.

Up to 50 percent by weight of other monobasic acids can be utilized in preparing the alkyd resin prepolymer, such as benzoic acid, acetic acid, propionic acid, caproic acid, pelargonic acid, lauric acid, palmetic acid, stearic acid and the like. The alkyd resin prepolymer, an aziridinyl compound and the acrylic monomeric units of the backbone are blended together with a solvent and a polymerization catalyst and reacted. The free acid of the alkyd resin prepolymer reacts with the aziridinyl group of the aziridinyl compound forming a prepolymer with one ethylenically unsaturated site. This prepolymer polymerizes with the backbone monomer units to form the graft copolymer.

Typical monomeric units which are used in the process of this invention to form the backbone of the graft copolymer are alkyl acrylates and alkyl methacrylates having one to four carbons in the alkyl groups, such as methyl methacrylate, ethyl methacrylate, propyl methacrylate, butyl methacrylate, ethyl acrylate, propyl acrylate, butyl acrylate and the like. Acrylonitrile, methacrylonitrile and styrene can also be utilized. Optionally, up to 20 percent by weight, based on the weight of the graft copolymer of acrylic adhesion promoting groups, can be added to the backbone segment. Typical adhesion promoting groups are any of those mentioned above.

The novel process of this invention can be used to prepare acrylic-epoxy ester graft copolymers useful for coating compositions. These coating compositions comprise a solution of 10–50 percent by weight of a film-forming polymer dissolved in an organic solvent, in which the film-forming polymer has a number average molecular weight of about 10,000–150,000 and is a graft copolymer having a polymeric backbone segment and polymeric side chain segments; wherein 1. the polymeric backbone segment comprises 10–90 percent by weight of the copolymer and is of polymerized monomer units which can either be an alkyl acrylate, an alkyl methacrylate, styrene or mixtures thereof, wherein the alkyl groups have one to three carbon atoms and the backbone segment can contain up to 50 percent by weight, based on the weight polymeric backbone segment, of polymerized acrylic monomers having adhesion promoting groups;

2. the polymeric side chain segments comprise 90–10 percent by weight of the copolymer and are grafted into the backbone segment through a coupling unit that is polymerized into the backbone and has the formula

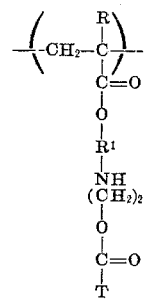

wherein —R is either —H or —$CH_3$; $R^1$ is an alkylene group of one to eight carbon atoms; and T is a polymer segment having a molecular weight of about 1,000–50,000 and consists essentially of polymerized epoxy ester units.

The coating composition is a solution that contains preferably about 15–30 percent by weight of the film-forming graft copolymer and 0.1–20 percent by weight pigment. This particular composition has excellent physical properties, such as good adhesion to bare metal substrates, chip resistance, crack and mar resistance which makes the coating particularly suitable as a primer composition for bare metals or as a sealer composition. Sealer compositions are applied over a primed surface and provide a finish to which acrylic lacquer or enamel topcoats can be applied. Also, the composition can be used as a primary coating for appliances, such as refrigerators, stoves, washers, dryers and the like.

The epoxy ester prepolymer used in the novel process of this invention is prepared by conventional polymerization techniques in which an epoxy resin, a dicarboxylic acid or a mixture of an anhydride of a dicarboxylic acid and a dicarboxylic acid, a solvent and polymerization catalyst are blended together and heated to about 120° to 200° C. for about 1–3 hours to form an epoxy ester prepolymer having a molecular weight of about 1,000–50,000, and preferably 2,000–20,000.

Any of the aforementioned solvent, diluents and esterification catalysts are used to prepare the epoxy ester prepolymer.

The epoxy resins utilized in the novel process of this invention to prepare the epoxy ester prepolymer have the repeating structural formula

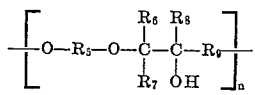

wherein $n$ is an integer sufficient to provide the epoxy resin with a molecular weight of at least about 500 and up to about 4,000, $R_5$ is a divalent aromatic radical; $R_6$, $R_7$ and $R_8$ are individually selected from the group of hydrogen and a $C_1$ to $C_5$ alkyl $R_9$ is a $C_1$ to $C_5$ alkylene group. $R_5$ as shown above, can be a bisphenol A or a bisphenol F, both of which can be substituted. Bisphenol A is para, para-isopropylidene diphenol and bisphenol F is 4,4'-dihydroxydiphenyl methane. Suitable substituents for these compounds include $C_1$ to $C_5$ alkyls, halogens, such as chlorine, bromine and fluorine, and $C_1$ to $C_5$ alkoxy groups.

The preferred epoxy resin is the reaction product of epichlorohydrin and bisphenol A which has the repeating structural formula

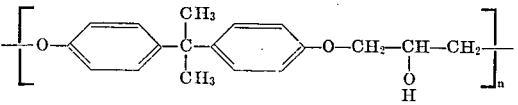

where $n$ is the same as above. Epichlorohydrin and bisphenol A polymer is preferred because it readily forms coatings which have a balance of desired physical properties, such as high tensile strength, excellent solvent resistance and excellent adhesion to substrates and to acrylic lacquers or enamel topcoats.

Another very useful epoxy resin is the reaction product of epichlorohydrin and bisphenol F which has the repeating structural formula

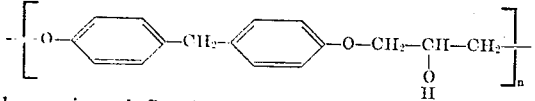

where $n$ is as defined above.

The dicarboxylic acid used to prepare the epoxy ester prepolymer is of the general formula

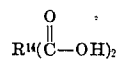

where $R^{14}$ is a divalent organic radical. Also, blends of dicarboxylic acids and anhydrides of dicarboxylic acids can be utilized. Typical dicarboxylic acids can be used to prepare the prepare the polymer are, for example, aromatic dicarboxylic acids, aliphatic dicarboxylic acids, alicyclic dicarboxylic acids, or a mixture of any of these acids and anhydrides of these acids. Typical saturated aliphatic dicarboxylic acids are succinic, glutaric, adipic, pimelic, suberic, azelaic, brassic, dodecanedoic and the like; alicyclic dicarboxylic acids are, for example, hexahydroterephthalic acid, tetrahydroisophthalic acid, tetrahydroterephthalic acid, hexahydrophthalic acid, tetrahydrophthalic acid; typical aromatic dicarboxylic acids are phthalic, isophthalic acid, terephthalic acid, 1,5-naphthalene dicarboxylic acid, 2,2'-dibenzoic dicarboxylic acid, 2,2'-isopropylidenedibenzoic acid, 2,2'-ketodibenzoic acid, oxydibenzoic acid, 2,2'sulfondibenzoic acid, and the like.

Up to 15 percent by weight monobasic acids can be utilized in preparing the epoxy ester prepolymer, such as benzoic acid, acetic acid, propionic acid, caproic acid, pelargonic acid, lauric acid, palmetic acid, stearic acid and the like. Also, drying oil fatty acids, such as tung oil, can also be utilized in preparing the epoxy ester prepolymer.

The epoxy ester prepolymer, an aziridinyl compound and the acrylic monomer units for the backbone are blended together with additional solvents and a polymerization catalyst and reacted according to the process of this invention to form the acrylic-epoxy ester graft copolymer.

Typical monomer units which are used in the novel process of this invention to form the backbone of the acrylic-epoxy ester graft copolymer are styrene, alkyl acrylates or alkyl methacrylates having one to three carbon atoms in the alkyl group, such as methyl methacrylate, propyl methacrylate, ethyl acrylate, propyl acrylate and the like. Optionally, up to 10 percent by weight of the backbone segment of units of $\alpha$,$\beta$-unsaturated carboxylic acid can be used such as, acrylic acid, methacrylic acid, crotonic acid, ethacrylic acid, itaconic acid and the like. Acrylic acid and methacrylic acid are preferred in amounts of 0.1–5 percent by weight of the backbone segment.

Up to 50 percent by weight, based on the weight of the backbone segment of the polymer, of acrylic monomers that have adhesion promoting groups and are described above can be utilized.

The following are examples of typical acrylic backbone monomers having adhesion promoting groups suitable for use in the novel process of this invention for preparing these acrylic-epoxy ester graft copolymers:

97/3–99/1 methyl methacrylate/hydroxyaminopropyl methacrylate; 95/3/2 methyl methacrylate/methacrylic acid/3-amino-3-hydroxy-propyl methacrylate; 50/50–99/1 methyl methacrylate/diethylaminoethyl methacrylate; 75/25–99/1 methyl methacrylate/ 2- aminopropyl methacrylate; 75/25–99/1 methyl methacrylate/2-aminoethyl methacrylate; 50/50–99/1 methyl methacrylate/2-(1-aziridinyl)-ethyl methacrylates; 50/50–99/1 methyl methacrylate/t-butylaminoethyl methacrylate; 50/50–99/1 methyl methacrylate/dimethylaminoethyl methacrylate; 90/10–99/1 methyl methacrylate/N-2-hydroxypropyl methacrylamide; 90/10–99/1 methyl methacrylate/N-2-hydroxyethyl methacrylamide.

One particularly preferred adhesion promoting group is provided by a monomer having the formula

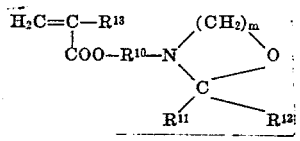

wherein $m$ is an integer having a value of 2 to 3, $R^{13}$ is selected from hydrogen, methyl, ethyl. $R^{10}$ is selected from $C_1$ to $C_5$ alkylene groups, and $R^{11}$ and $R^{12}$ are selected from (1) separate groups selected individually from (a) hydrogen, phenyl, benzyl and $C_1$ to $C_{12}$ alkyl groups in the case of $R^{11}$ and (b) hydrogen and $C_1$ to $C_4$ alkyl groups in the case of $R^{12}$, and (2) a single group selected from pentamethylene and tetramethylene which, together with the carbon atom to which the single group is attached, forms a carbocyclic group.

The aforementioned adhesion promoting monomer used in the process of this invention is prepared according to the procedure described in the aforementioned U.S. Pat. No. 3,037,006.

An especially preferred embodiment of this adhesion promoting monomer used in the backbone of the polymer of this invention is of the formula

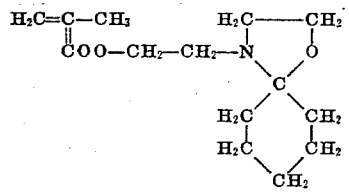

It will be apparent to those skilled in the art that this monomer can be referred to as (1) 3-β-methacryloxyethyl)-2,2-pentamethylene-oxazolidine; (2) 3-(2-methacryloxyethyl)-2,2-spirocyclohexyl-oxazolidine; (3) MESO or (4) 1-oxa-4-(2'-methacryloxy-ethyl)-4-azaspiro [4.5] decane.

The backbone of one particularly useful acrylicepoxy ester graft copolymer prepared according to the process of this invention contains about 80–99 percent by weight methyl methacrylate and about 1–20 percent by weight of 3-(2-methacryloxyethyl)-2,2-spirocyclohexyl oxazolidine.

Preferably, about 1–30 percent by weight, based on the weight of the film-forming constituents of a plasticizer, can also be used in the coating composition formed from graft copolymers prepared according to this invention, such as butylbenzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexylester of hexamethylene diphthalate, di(methylcyclohexyl) phthalate.

Other plasticizers which can be used are epoxidized soya bean oil, oil free and oil modified alkyds and polyesters, such as phthalate esters, polyalkylene adipate esters, or polyarylene adipate esters.

Pigments are used in the coating composition prepared from the graft copolymers of the novel process of this invention in the amounts of 0.1–20.0 percent by weight, and preferably, about 0.3–6.0 percent by weight of pigment, is used. Preferably, the pigment is formed into a mill base using conventional techniques and then blended with the coating composition. Examples of the great variety of pigments which are used in the novel coating composition of this invention are metallic oxides, preferably titanium dioxide, zinc oxide, and the like, metal hydroxides, metal flakes, metal powders, chromates, such as lead chromate, sulfides, sulfates, carbonates, carbon black, silica, talc, china clay, lead and iron blues, organic reds, maroons, organic dyes, lakes, etc.

Coating compositions of graft copolymers prepared in this invention can be applied to a variety of substrates, for example, metal, wood, glass, plastics, such as polypropylene, styrene copolymers of styrene and the like, by any one of the usual application methods, such as spraying, electrostatic spraying, dipping, brushing, flow coating electrocoating, and the like. Many of these coatings can be air dried, but preferably, are baked about 110°–200°C. for about 10—60 minutes. The resulting coating is about 1-5 mils thick, preferably 1—3 mils thick and can be rubbed or polished in accordance with conventional techniques, if desired, to improve smoothness or apparent gloss or both.

The following examples illustrate this invention. The parts and percentages are by weight unless otherwise specified.

EXAMPLE 1

| | Parts by Weight |
|---|---|
| Portion 1 | |
| Toluene | 1167.0 |
| Methylethyl ketone | 254.0 |
| Methyl methacrylate monomer | 2579.0 |
| Portion 2 | |
| Azocyano pentanoic acid - [4,4'-azobis(4-cyanopentanoic acid)] | 10.0 |
| Toluene | 204.0 |
| Portion 3 | |
| Azocyano pentanoic acid | 12.0 |
| Toluene | 175.0 |
| Portion 4 | |
| Azocyano pentanoic acid | 12.0 |
| Cellosolve | 175.0 |
| Portion 5 | |
| Azocyano pentanoic acid | 6.0 |
| Cellosolve | 87.0 |

| Portion 6 | |
|---|---|
| Azocyano pentanoic acid | 5.5 |
| Cellosolve | 88.0 |

| Portion 7 | |
|---|---|
| Xylene | 1985.0 |

| Portion 8 | |
|---|---|
| Triethyl amine | 58.0 |

| Portion 9 | |
|---|---|
| 2-(1-Aziridinyl) ethyl methacrylate | 87.5 |
| Butanol | 292.0 |

| Portion 10 | |
|---|---|
| Pelargonic acid | 35.0 |

| Portion 11 | |
|---|---|
| Acetone | 758.0 |

| Portion 12 | |
|---|---|
| 2-ethylhexyl acrylate | 753.0 |
| Azo-bis-isobutyronitrile | 7.5 |

| Portion 13 | |
|---|---|
| Azo-bis-isobutyronitrile | 4.4 |

| Portion 14 | |
|---|---|
| Azo-bis-isobutyronitrile | 3.0 |

| Portion 15 | |
|---|---|
| Toluene | 1257.0 |

| | |
|---|---|
| Total | 10,014.9 |

Portion 1 is charged into a polymerization vessel equipped with a stirrer and reflux condenser and heated to about 85° C. Portion 2 is charged into the vessel and the batch is brought to its reflux temperature by an exothermic reaction and held at its reflux temperature for 15 minutes. Portion 3 is then added and the reaction mixture is held at its reflux temperature for 10 minutes. Portion 4 is then added and the reaction mixture is held at its reflux temperature for 10 minutes. Portion 5 is added and the reaction mixture is held at its reflux temperature for 10 minutes. Portion 6 is added and the reaction mixture is held at its reflux temperature for 2 hours. Portion 7 is then added and immediately after the addition of Portion 7, Portions 8 and 9 are added and the reaction mixture is heated to its reflux temperature and held at this temperature for 1 hour. Portion 10 is then added and the reaction mixture is held at its reflux temperature for an additional hour. Portion 11 is added and the temperature of the reaction mixture is reduced to about 90° C. Portion 12 is then added and the reaction mixture is heated to its reflux temperature and held at this temperature for 1½ hours. Portion 13 is then added and the reaction mixture is held at its reflux temperature for 30 minutes. Portion 14 is then added and the reaction mixture is held at its reflux temperature for 1½ hours. Portion 15 is added and the polymer solution is cooled to room temperature.

The resulting polymer solution is a polymer solids content of about 34 percent, the relative viscosity of the polymer is 1.330 measured at 0.5 percent polymer solids in an ethylene dichloride and the polymer has an acid number of 1.4. The polymer solution has a Gardner Holdt viscosity at 25° C. of Z.

Four coating compositions are formulated with the above prepared polymer solution using 0, 5, 10 and 20 percent by weight of a plasticizer. The plasticizer is an alkyd resin of coconut oil/ethylene glycol phthalate. Conventional solvents are used to dilute the compositions to a viscosity which can be applied by a doctor blade. Each of the above prepared coating compositions are applied to a steel substrate primed with a standard iron oxide alkyd primer composition. A doctor blade is used to apply a film which after baking at 150° C. for 30 minutes gives a film about 2 mils in thickness. The resulting films have excellent clarity, good gloss, and excellent water spot resistance and solvent crazing resistance.

EXAMPLE 2

| | Parts by Weight |
|---|---|
| Portion 1 | |
| Cellosolve | 170.0 |
| Toluene | 250.0 |
| Butanol | 250.0 |
| Methyl methacrylate | 250.0 |
| Methacrylic acid | 15.0 |
| Portion 2 | |
| Methyl methacrylate | 150.0 |
| Methacrylic acid | 13.0 |
| Azo-bis-isobutyronitrile | 4.0 |
| Portion 3 | |
| Methyl methacrylate | 80.0 |
| Methacrylic acid | 12.0 |
| Azo-bis-isobutyronitrile | 2.0 |
| Portion 4 | |
| Azo-bis-isobutyronitrile | 1.0 |
| Portion 5 | |
| Azo-bis-isobutyronitrile | 1.0 |
| Portion 6 | |
| Triethylamine | 8.0 |
| Portion 7 | |
| 2(1-Aziridinyl) ethyl methacrylate | 8.0 |
| Lauryl methacrylate | 120.0 |
| Methyl methacrylate | 152.0 |
| Portion 8 | |
| Acetone | 300.0 |
| Portion 9 | |
| Azo-bis-isobutyronitrile | 1.0 |
| Portion 10 | |
| Azo-bis-isobutyronitrile | 0.5 |
| Portion 11 | |
| Azo-bis-isobutyronitrile | 0.5 |
| Isopropyl alcohol | 220.0 |
| Ethylene imine | 18.0 |
| Portion 12 | |

| | |
|---|---|
| Azo-bis-isobutyronitrile | 0.5 |
| Total | 2026.5 |

Portion 1 is charged into a reaction vessel equipped with a stirrer and a reflux condenser and the reaction mixture is heated to its reflux temperature. Portion 2 is added over a 30-minute period while the reaction mixture is held at its reflux temperature. Portion 3 is slowly added over a 30-minute period while the reaction mixture is held at its reflux temperature, for 15 minutes. Portion 4 is added and the reaction mixture is held at its reflux temperature for 15 minutes. Portion 5 is added and the reaction mixture is held at its reflux temperature for 15 minutes. Portion 6 is added and Portion 7 is added immediately after Portion 6. The reaction mixture is held at its reflux temperature for about 1 hour. Portion 8 is added and the temperature is lowered to about 80° C. and Portion 9 is added immediately and the reaction mixture is held at its reflux temperature for an additional 2 hours. Portion 10 is added and the reaction mixture is held at its reflux temperature for one-half hour. Portion 11 is added and the reaction mixture is held at its reflux temperature for 45 minutes. Portion 12 is then added and the reaction mixture is held at the reflux temperature for an additional 20 minutes.

The resulting polymer solution has a total polymer solids of 37.6 percent, and a Gardner Holdt viscosity at 25° C. of W + ⅓. The polymer has a relative viscosity of 1.178 measured at 0.5 percent polymer solids in ethylene dichloride at 25° C. and has an acid number of less than 1.

A 2 mil film is applied to a metal substrate primed with an iron oxide alkyd resin primer and baked for 30 minutes at 150° C. The resulting film has excellent clarity, good gloss, excellent water spot resistance, good cold crack resistance and good solvent craze resistance.

A film is applied over a steel sheet primed with a sheet metal alkyd dip primer and baked as above. The film has excellent adhesion over this primer, which is surprising since many coating compositions generally do not have good adhesion to these types of primers without the use of a special sealer coat.

The above prepared polymer solution is blended with about 5 percent by weight of a standard alkyd plasticizer of ethylene glycol/coconut oil/phthalic acid and is compatible with this plasticizer which indicates that this composition is useful as an exterior finish for automobiles and trucks. A film of this composition is applied over a steel sheet primed as above and baked for 30 minutes at 150° C. The resulting film has excellent physical properties similar to those listed for the above finish.

EXAMPLE 3

| | Parts by Weight |
|---|---|
| Portion 1 | |
| Xylene | 200.0 |
| Toluene | 150.0 |
| Butanol | 180.0 |
| Portion 2 | |
| Methyl methacrylate | 450.0 |
| Methacrylic acid | 30.0 |
| Azo-bis-isobutyronitrile | 4.8 |
| Portion 3 | |
| Azo-bis-isobutyronitrile | 1.0 |
| Portion 4 | |
| Azo-bis-isobutyronitrile | 1.0 |
| Portion 5 | |
| Triethylamine | 6.0 |
| Portion 6 | |
| 2-(1-Aziridinyl) ethyl methacrylate | 6.0 |
| 2-Ethylhexyl acrylate | 114.0 |
| Portion 7 | |
| Acetone | 200.0 |
| Portion 8 | |
| Azo-bis-isobutyronitrile | 0.5 |
| Portion 9 | |
| Azo-bis-isobutyronitrile | 0.5 |
| Portion 10 | |
| Propyleneimine | 22.0 |
| Total | 1365.8 |

Portion 1 is charged into a polymerization vessel equipped with a stirrer and a reflux condenser and heated to its reflux temperature. Portion 2 is charged into the reaction vessel over a 1-hour period and held for 15 minutes at its reflux temperature. Portion 3 is added and the reaction mixture is held at its reflux temperature for an additional 15 minutes. Portion 4 is then added and the reaction mixture is held at its reflux temperature for an additional 30 minutes. Portion 5 is added and portion 6 is added immediately after Portion 5. Portion 7 is added immediately after Portion 6 and the temperature reduces to 80° C. Portion 8 is then added immediately and the reaction mixture is heated to its reflux temperature and maintained at this temperature for 1½ hours. Portion 9 is then added and the reaction mixture is held at its reflux temperature for an additional hour. Portion 10 is then added and the reaction mixture is held at its reflux temperature for another hour.

The resulting polymer solution has a total polymer solids content of 45.0 percent, a Gardner Holdt viscosity at 25° C. of about Z and the polymer has a relative viscosity of 1.164 measured at 0.5 percent polymer solids in ethylene dichloride at 25° C. and has an acid number of about 1.0.

A mill base is prepared by blending the following ingredients:

| | Parts by Weight |
|---|---|
| Portion 1 | |
| Polymer solution (prepared above) | 50 |
| Ethylene glycol diacetate | 21 |
| Cellosolve acetate | 15 |
| Xylene | 69 |

| | Parts by Weight |
|---|---|
| Portion 2 | |
| Titanium dioxide pigment (Rutile pigment) | 347 |
| Xylene | 60 |
| Total | 562 |

Portion 1 is charged into a mixer and is thoroughly blended. Portion 2 is then added and the mixture is thoroughly blended for 30 minutes. The mixture is then charged into a conventional sand mill and ground to a 0.1 mill fineness.

A lacquer is prepared by blending the following ingredients:

| | Parts by Weight |
|---|---|
| Mill base (prepared above) | 230 |
| Polymer solution (prepared above) | 130 |
| Xylene | 72 |
| Total | 432 |

The above lacquer is diluted to a spray viscosity using a conventional lacquer thinner and is sprayed onto a steel panel primer with a high pigment volume primer surfacer which has been added sanded to a smooth surface. The panel is baked at 165° C. for about 30 minutes. The resulting coating is about 2.5 mils thick. The coating has an excellent gloss and appearance, excellent solvent resistance, particularly to gasoline, and has excellent water spot resistance and solvent craze resistance. This lacquer can be utilized as a topcoat for automobiles and trucks.

EXAMPLE 4

The following ingredients are charged into a reaction vessel equipped with a stirrer and a reflux condenser to form an epoxy ester prepolymer:

| | Parts by Weight |
|---|---|
| Portion 1 | |
| Epoxy resin ("Epon" 1004)* | 1375.50 |
| Benzoic acid | 21.50 |
| Adipic acid | 103.00 |
| Lithium ricinoleate | 0.75 |
| Benzyltrimethyl ammonium hydroxide | 2.00 |
| Ethylene glycol mono-ethyl ether | 265.00 |
| Portion 2 | |
| Ethylene glycol mono-ethyl ether | 735.00 |
| Portion 3 | |
| Ethylene glycol mono-ethyl ether | 500.00 |
| Portion 4 | |
| Ethylene glycol mono-ethyl ether | 333.00 |
| Total | 3335.75 |

"Epon" 1004 has the following structural formula:

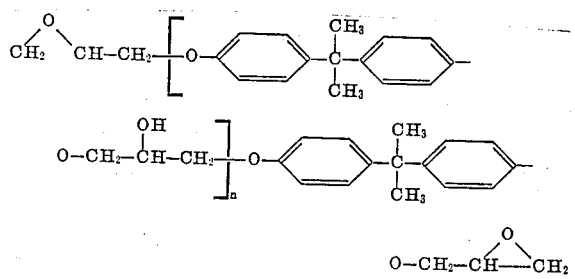

and has a Gardner Holdt viscosity measured at 40 percent by weight solution in butyl carbitol at 25° C. of Q-U, and has an epoxy equivalent of 875–1025. The epoxy equivalent is the grams of resin containing 1-gram equivalent of epoxide.

Portion 1 is charged into a reaction vessel equipped with a stirrer and reflux condenser and the ingredients are heated to the reflux temperature and are held at this temperature for about 2 hours. Portion 2 is then slowly added over a 10-minute period and the temperature of the reaction mixture is slowly reduced to room temperature. Portion 3 is then added and thoroughly blended and then Portion 4 is added. The resulting prepolymer solution has a polymer solids content of 45.4 percent and the solution has a Gardner Holdt viscosity measured at 25° C. of $Z_2$. The polymer has an acid number of 7.67.

A graft copolymer is prepared by reacting the following ingredients:

| | Parts by Weight |
|---|---|
| Portion 1 | |
| Prepolymer polymer solution prepared above (45.4% solids) | 500.0 |
| Triethylamine | 5.0 |
| Portion 2 | |
| Butyl alcohol | 180.0 |
| Portion 3 | |
| 2-(1-Aziridinyl) methyl methacrylate | 7.7 |
| Portion 4 | |
| Pelargonic acid | 2.7 |
| Portion 5 | |
| Acetone | 215.0 |
| Portion 6 | |
| MMA/MESO polymer blend [methyl methacrylate/3-(2-methacryloxyethyl)2,2-spirocyclohexyl oxazoilidine, weight ratio 85/15] | 210.1 |
| Tertiary butyl amino ethyl methacrylate | 4.5 |
| Azo-bis-isobutyronitrile | 2.0 |
| Portion 7 | |
| Azo-bis-isobutyronitrile | 0.8 |
| Portion 8 | |
| Azo-bis-isobutyronitrile | 0.3 |
| Total | 1128.1 |

Portion 1 is charged into a reaction vessel equipped with a stirrer and a reflux condenser and blended together. Portion 2 is then charged into the reaction vessel and blended with Portion 1. Portion 3 is then charged into the reaction vessel and the ingredients are heated to the reflux temperature which is about 120° C. and held at the reflux temperature for about 1 hour. Portion 4 is then added and the reaction mixture is refluxed for an additional hour. Portion 5 is then slowly added over a 10-minute period while maintaining the reaction mixture at its reflux temperature. Portion 6 is then added and the reaction mixture is maintained at its reflux temperature for about 1½ hours. Portion 7 is then added and the reaction mixture is maintained at its reflux temperature for an additional 45 minutes. Portion 8 is then added and the reaction mixture is refluxed for about 1 hour and 10 minutes.

The resulting polymer has an acid number of 2.1 and a relative viscosity of 1.133 measured at b 0.5 percent polymer solids in ethylene dichloride at 25° C. and the polymer solution has a total polymer solids content of 39.1 percent and a Gardner Holdt viscosity of about Y measured at 25° C.

A mill base is prepared as follows:

| | Parts by Weight |
|---|---|

| | |
|---|---|
| Carbon Black pigment | 0.70 |
| Titanium dioxide pigment | 20.13 |
| Aluminum silicate pigment | 19.91 |
| Polymer solution prepared above (39.1% polymer solids) | 21.05 |
| Solvent blend | 38.21 |
| Total | 100.00 |

The above ingredients are premixed and then charged into a conventional sand mill and ground in one pass to a 0.2 mill fineness.

The solvent blend utilized in the above mill base consists of 31 percent by weight methylethyl ketone, 24.1 percent by weight cellosolve, 23.2 percent by weight isopropanol and 21.7 percent by weight toluene.

A sealer composition suitable for use in bonding an automotive acrylic lacquer to a pigmented alkyd primer composition is prepared as follows:

| | Parts by Weight |
|---|---|
| High molecular weight epoxy resin (200,000 molecular weight of a polymer of epichlorohydrin and bisphenol A) | 22.33 |
| Acrylic-graft copolymer epoxy resin solution (prepared above) | 23.78 |
| Diethylamine | 0.08 |
| Mill base (prepared above) | 14.44 |
| Solvent blend (described above) | 39.37 |
| Total | 100.00 |

These ingredients are charged into a mixer and agitated for 1 hour. The resulting composition has a total solids content of 27.2 percent by weight and a No. 2 Zahn cup viscosity of 24 seconds.

The composition is then reduced to a spray viscosity using the aforementioned solvent blend and a steel substrate coated with an alkyd primer composition pigmented with iron oxide is sprayed with the composition and air dried for 5 minutes giving a sealer film of 0.25 mil in thickness. A coating of a standard automotive acrylic lacquer is then applied over the substrate using conventional spraying and baking procedures. The acrylic topcoat has excellent adhesion to the substrate and the composite has excellent chip resistance as measured by a gravelometer tester, excellent crack resistance and excellent adhesion to the substrate.

EXAMPLE 5

The following ingredients are charged into a reaction vessel equipped with a stirrer and a reflux condenser to form an epoxy ester prepolymer:

| Portion 1 | Parts by Weight |
|---|---|
| "Empol" 1014 (dimer fatty acids) | 229.50 |
| Benzoic acid | 12.00 |
| "Epon" 1004 (Described in Example b 1) | 785.50 |
| Benzyl trimethyl ammonium hydroxide | 1.25 |
| Lithium ricinoleate | 0.50 |
| Dibutyl carbitol | 177.00 |
| Methyl isoamyl ketone | 48.00 |
| Portion 2 | |
| Ethylene glycol monoethyl ether | 500.00 |
| Xylene | 275.00 |
| Total | 2028.75 |

Portion 1 is charged into a reaction vessel and the ingredients are heated to the reflux temperature and held at this temperature for about 3 hours. Portion 2 is then slowly added over a 5 minute period and the temperature of the reaction mixture is slowly reduced to room temperature. The resulting prepolymer solution has a polymer solids content of about 50 percent and has a Gardner Holdt viscosity measured at 25° C of $Z_3$. The polymer has an acid number of about 7.0.

A graft copolymer is prepared by reacting the following ingredients:

| Portion 1 | Parts by Weight |
|---|---|
| Prepolymer solution prepared above (50% solids) | 540.0 |
| Triethylamine | 6.0 |
| Butyl alcohol | 180.0 |
| Portion 2 | |
| 2-(1-Aziridinyl) methyl methacrylate | 9.0 |
| Portion 3 | |
| Pelargonic acid | 3.6 |
| Portion 4 | |
| Acetone | 220.0 |
| Portion 5 | |
| Toluene | 224.0 |
| MESO/MMA polymer blend [3-(2-methacryloxyethyl)2,2-spirocyclohexyl oxazolidine/methyl methacrylate copolymer, weight ratio 15/85)] | 311.4 |
| T-butyl-amino ethyl methacrylate | 6.0 |
| Azo-bis-isobutyronitrile | 3.0 |
| Portion 7 | |
| Azo-bis-isobutyronitrile | 1.2 |
| Portion 8 | |
| Azo-bis-isobutyronitrile | 0.6 |
| Portion 9 | |
| Azo-bis-isobutyronitrile | 0.6 |
| Total | 1505.4 |

Portion 1 is charged into a reaction vessel equipped with a stirrer ad reflux condenser and the ingredients are blended together. The reaction vessel is then heated, then Portion 2 is charged into the reaction vessel and blended with Portion 1. Then the ingredients are heated to the reflux temperature, which is about 120° C. and held at this reflux temperature for about 1 hour. Portion 3 is added and the reaction mixture is refluxed for an additional hour. Portion 4 is then slowly added over a 5-minute period and thoroughly blended with the reaction mixture. Portion 5 is added and Portion 6 is added and the reaction mixture is heated to its reflux temperature and held at this temperature for an additional hour. Portion 7 is added and the reaction mixture is held at its reflux temperature for an additional 45 minutes. Portion 8 is added and the reaction mixture is refluxed for an additional 45 minutes. Portion 9 is then added and the reaction mixture is refluxed for an additional hour.

The resulting polymer has an acid number of 1.6 and a relative viscosity of 1.157 measured at 0.5 percent polymer solids in ethylene dichloride at 25° C. The polymer solution has a total polymer solids content of 39.2 percent and the Gardner Holdt viscosity measured at 25° C. of about $Z_2$.

The above prepared polymer solution is reduced to a spray viscosity utilizing the solvent blend described in Example 1 and applied to a steel substrate primed with an alkyd resin pigmented with iron oxide and baked at b 200° C. for thirty minutes. The resulting film is clear and has excellent adhesion to the substrate and forms an excellent finish.

A sealer composition suitable for use in bonding an automotive acrylic lacquer to a pigmented alkyd primer composition is prepared as follows:

|  | Parts by Weight |
|---|---|
| High molecular weight epoxy resin (200,000 molecular weight resin of a polymer of epichlorohydrin and bisphenol A) | 22.33 |
| Graft copolymer solution (39.2% solids prepared above) | 23.78 |
| Diethylamine | 0.80 |
| Mill base composition (prepared in Example 1) | 14.44 |
| Solvent blend (described in Example 1) | 39.37 |
| Total | 100.72 |

These ingredients are charged into a mixer and agitated for 1 hour. The resulting composition has a total solids content of 27.2 and a No. 2 Zahn cup viscosity of 24 seconds.

The composition is then reduced to a spray viscosity using the solvent blend (described in Example 1) and a steel substrate coated with an alkyd primer composition pigmented with iron oxide is sprayed with the composition and air dried for about 5 minutes, giving a film of about 0.25 mils in thickness. A coating of a standard automotive acrylic lacquer is then applied over the above coating using conventional procedures. The acrylic lacquer topcoat has excellent adhesion to the substrate. The composite of the primer, sealer coat and the acrylic topcoat has excellent chip resistance, as measured by a gravelometer test, excellent crack resistance and excellent adhesion to the substrate.

EXAMPLE 6

A prepolymer is prepared of methyl methacrylate/acrylic acid in a weight ratio of 70/30 by charging the following ingredients into a conventional polymerization vessel equipped with a stirrer and a reflux condenser:

|  | Parts by Weight |
|---|---|
| Portion 1 | |
| Ethylene glycol mono-ethyl ether | 640 |
| Anhydrous isopropyl alcohol | 160 |
| Portion 2 | |
| Methyl methacrylate monomer | 560 |
| Acrylic acid monomer | 240 |
| Azo-bis-isobutyronitrile | 16 |
| Portion 3 | |
| Anhydrous isopropyl alcohol | 178 |
| Total the | 1794 |

Portion 1 is charged into the reaction vessel and thoroughly blended and heated to the reflux temperature of the mixture which is about 110° C. Portion 2 is premixed and slowly added over a 2-hour period while maintaining the reaction mixture at its reflux temperature. The reaction mixture is maintained at its reflux temperature for an additional hour and Portion 3 is added, thoroughly mixed and the reactants are cooled to room temperature.

The resulting polymer solution has a total solids content of 45 percent and the polymer has an acid number of 229, a Gardner Holdt viscosity measured at 25° C. of Y. The polymer has A relative viscosity of 1.078 measured at 0.5 percent polymer solids in ethylene dichloride solvent at 25° C.

A graft copolymer dispersion is then prepared as follows:

|  | Parts by Weight |
|---|---|
| Portion 1 | |
| Prepolymer solution prepared above (45% polymer solids) | 356.0 |
| Anhydrous isopropyl alcohol | 504.0 |
| Dionized water | 150.0 |
| Portion 2 | |
| Triethyl amine | 50.0 |
| Portion 3 | |
| Methyl methacrylate monomer | 11 635.2 |
| 2-(1-Aziridinyl)ethyl methacrylate | 4.8 |
| Portion 4 | |
| Azo-bis-isobutyronitrile | 3.0 |
| Portion 5 | |
| Triethyl amine | 17.0 |
| Portion 6 | |
| Azo-bis-isobutyronitrile | 2.0 |
| Portion 7 | |
| Deionized water | 800.0 |
| Portion 8 | |
| Deionized water | 710.0 |
| Total | 2522.0 |

Portion 1 is charged into a reaction vessel and thoroughly mixed, then Portion 2 is added. Portion 3 is premixed and added to the reaction vessel and the reaction mixture is heated to its reflux temperature of about 85° C and held at its reflux temperature for about 1 hour. Portion 4 is then added and the reaction mixture is held at its reflux temperature for 30 minutes. Portion 5 is added and the reaction mixture is held at reflux for 30 minutes. Portion 6 is added and then Portion 7 is slowly added to the reaction mixture and the reaction mixture is held at its reflux temperature for about 45 minutes. Portion 8 is then slowly added over a 30-minute period and the reaction mixture is cooled to room temperature.

The resulting polymer dispersion has a polymer solids content of 24.9 percent and the polymer has an acid number of 45.2 and a relative viscosity measured at 25° C. of 1.393 measured at 0.5 percent polymer solids in ethylene dichloride at 25° C. The dispersion is stable for long periods of time.

A film of the dispersion is applied to a steel plate coated with a conventional alkyd primer and with a conventional sealer using a doctor blade and baked at 160° C. for 30 minutes. The resulting film was clear, tough and durable and had an excellent appearance.

EXAMPLE 7

A prepolymer is prepared by reacting the following ingredients:

|  | Parts by Weight |
|---|---|
| Portion 1 | |
| Ethylene glycol mono-ethyl ether | 750 |
| Anhydrous isopropyl alcohol | 750 |
| Portion 2 | |
| Methyl methacrylate monomer | 500 |
| Acrylic acid monomer | 500 |
| Azo-bis-isobutyronitrile | 20 |
| Total | 2520 |

Portion 1 is charged into a reaction vessel and heated to its reflux temperature which is about 95° C. Portion 2 is premixed and slowly added to the reaction vessel over a 2-hour period while the reaction is maintained at its reflux temperature. After Portion 2 is added, the reaction mixture is held at its reflux temperature for an additional hour. The resulting polymer has an acid umber of 379, a relative viscosity of 1.6 measured at 0.5 percent polymer solids methylene dichloride at 25° C. The composition has a polymer solids content of 42 percent and a Gardner Holdt viscosity measured at 25° C. of U.

A graft copolymer dispersion is prepared as follows:

|  | Parts by Weight |
|---|---|
| Portion 1 | |
| Prepolymer solution prepared above (42% solids) | 100 |
| Ethylene glycol mono-ethyl ether | 256 |
| Anhydrous isopropyl alcohol | 200 |
| Deionized water | 200 |
| Portion 2 | |
| Triethyl amine | 28.0 |
| Anhydrous isopropyl alcohol | 56.0 |
| Portion 3 | |
| 2-(1-Aziridinyl)ethyl methacrylate | 1.5 |
| Methyl methacrylate monomer | 208.5 |
| Portion 4 | |
| Methyl methacrylate monomer | 250 |
| Azo-bis-isobutyronitrile | 2.5 |
| Portion 5 | |
| Azo-bis-isobutyronitrile | 2.0 |
| Portion 6 | |
| Deionized water | 450.0 |
| Total | 1754.5 |

Portion 1 is premixed and charged into a reaction vessel equipped with a reflux condenser. Portion 2 is premixed and added to the reaction vessel with Portion 1 and thoroughly mixed. Portion 3 is premixed and added to the reaction vessel and the reaction mixture while being agitated is heated to its reflux temperature of about 85° C. and held at reflux for about 1 hour. Portion 4 is then premixed and added and the reaction mixture is held at its reflux temperature for an additional hour. Portion 5 is then added and then Portion 6 is slowly added over a 20-minute period while maintaining the reaction mixture at its reflux temperature. The reaction mixture is then cooled to room temperature.

The resulting polymer dispersion has a total solids content of 29 percent and has a Gardner Holdt viscosity at 25° C. of E. The polymer has an acid number of 29.5 and a relative viscosity of 1.173 measured at 0.5 percent polymer solids in dimethyl formamide at 25° C.

A film of the above prepared polymer solution is applied to a glass plate using a doctor blade, and the coating is baked for 30 minutes at 160° C. The resulting film is tough, durable and has an excellent appearance.

A mill base is prepared as follows:

|  | Parts by Weight |
|---|---|
| Water/solvent mixture (water/ethylene glycol monoethyl ether acetate/ethylene glycol monobutyl ether, weight ratio 1/1/3) | 26.9 |
| Plasticizer (Benzyl Texanol* phthalate) | 4.3 |
| Titanium dioxide pigment | 43.0 |
| Polymer dispersion (prepared above 29% solids) | 25.8 |
| Total | 100.0 |

*Texanol - 2,2,4-trimethyl-1,3-pentane diol isobutyrate.

The above ingredients are premixed and then charged into a conventional sand mill and ground to 0.5 mil fineness. The resulting mill base has a pigment to binder ratio of 370/100.

A lacquer is prepared by blending the following ingredients:

| | Parts by Weight |
|---|---|
| Polymer dispersion (prepared above) | 222.0 |
| Mill base (prepared above) | 86.0 |
| Benzyl Texanol* phthalate plasticizer | 26.3 |
| Total | 334.3 |

The lacquer is reduced to a spray viscosity of a No. 4 Ford cup by reducing the lacquer about 60 percent by volume with a solvent blend of ethylene glycol monobutyl ether/ethylene glycol monoethyl ether acetate/acetone/water in a weight ratio of 17/9/17/31/26.

The resulting composition is sprayed onto a steel panel coated with a conventional alkyd primer and a sealer and baked for about 30 minutes at 160° C. The resulting coating has the following properties:

| | |
|---|---|
| 20°/60° gloss | 81/89 |
| Knoop hardness | 13.8 |
| Craze resistance to methylethyl ketone solvent | Yes |
| Gasoline resistance | Excellent |
| Total film build | 3.0 mils |

EXAMPLE 8

A graft copolymer is prepared by reacting the following ingredients:

| | Parts by Weight |
|---|---|
| Portion 1 | |
| Prepolymer solution in Example 1 (42% solids) | 100.0 |
| Ethylene glycol mono-ethyl ether | 206.0 |
| Anhydrous isopropyl alcohol | 170.0 |
| Isobutyl alcohol | 100.0 |
| Deionized water | 150.0 |
| Portion 2 | |
| Anhydrous isopropyl alcohol | .36 |
| Triethyl amine | 28 |
| Portion 3 | |
| 2-(1-Aziridinyl)ethyl methacrylate | 1.5 |
| Butyl methacrylate | 75.0 |
| Methyl methacrylate monomer | 233.5 |
| Portion 4 | |
| Methyl methacrylate monomer | 50.0 |
| Azo-bis-isobutyronitrile | 1.0 |
| Portion 5 | |
| Methyl methacrylate monomer | 100.0 |
| Butyl alcohol | 100.0 |
| Portion 6 | |
| Azo-bis-isobutyronitrile | 0.5 |
| Portion 7 | |
| Azo-bis-isobutyronitrile | 0.5 |
| Portion 8 | |
| Deionized water | 900.0 |
| Total | 2252.0 |

Portion 1 is premixed and added to a polymerization vessel equipped with a reflux condenser and a stirrer. Portion 2 is premixed and added and the ingredients are thoroughly blended together. Portion 3 is premixed and added and the reaction mixture while being agitated is heated to its reflux temperature which is about 85° C. and held at its reflux temperature for about 1 hour and 15 minutes. Portion 4 is then premixed and added to the reaction mixture which is held at its reflux temperature for an additional 30 minutes. Portion 5 is added and the reaction mixture is refluxed for an additional hour. Portion 6 is added and the reaction mixture is refluxed for 30 minutes. Portion 7 is added and Portion 8 is then slowly added over a 1-hour period.

A stable dispersion is formed which has a polymer solids content of 20.4 percent and the polymer has an acid number of 28.8 and a relative viscosity of 1.253 measured at 0.5 percent polymer solids in dimethyl formamide at 25° C.

A thin coating of the above prepared dispersion is applied with a doctor blade to a steel plate coated with a conventional primer and sealer and the coating is baked at about 116° C. for 30 minutes. The dried coating has an excellent appearance and is durable, tough and scratch resistant.

EXAMPLE 9

A graft copolymer is prepared by reacting the following ingredients:

| | Parts by Weight |
|---|---|
| Portion 1 | |
| Prepolymer solution (prepared in Example 2) polymer solids content 42% | 150.0 |
| Ethylene glycol mono-ethyl ether | 341.0 |
| Anhydrous isopropyl alcohol | 253.0 |
| Ethylene glycol mono-butyl ether | 386.0 |
| Deionized water | 300.0 |
| Portion 2 | |
| Anhydrous isopropyl alcohol | 88.0 |
| Triethyl amine | 42.0 |
| Portion 3 | |
| 2-(1-Aziridinyl) ethyl methacrylate | 2.0 |
| Methyl methacrylate monomer | 638.0 |
| Portion 4 | |
| Methyl methacrylate monomer | 250.0 |
| Azo-bis-isobutyronitrile | 4.0 |
| Portion 5 | |
| Methyl methacrylate monomer | 50.0 |
| Azo-bis-isobutyronitrile | 2.0 |
| Portion 6 | |
| Azo-bis-isobutyronitrile | 1.0 |
| Portion 7 | |
| Deionized water | 1300.0 |

|   | Total | 3807.0 |
|---|---|---|

Portion 1 is charged into a reaction vessel equipped with a stirrer and a reflux condenser and thoroughly mixed. Portion 2 is premixed and added to the reaction vessel. Portion 3 is premixed and added to the reaction vessel and the reaction mixture is heated to its reflux temperature and held at this temperature for about 1½ hours. Portion 4 is premixed and added to the reaction mixture which is heated to its reflux temperature and held at this temperature for 1 hour and 15 minutes Portion 5 is premixed and added to the reaction mixture and held at its reflux temperature for an additional 30 minutes. Portion 6 is added and immediately thereafter Portion 7 is slowly added over a 40-minute period.

The resulting composition is a stable emulsion having a polymer solids content of 25.6 percent, the polymer has an acid number of 22.5 and a relative viscosity of 1.191 measured at 0.5 percent polymer solids in dimethyl formamide at 25° C.

A thin coating of the above prepared emulsion is applied to a steel substrate coated with a conventional primer and a sealer and the coating is baked for 30 minutes at about 160° C. The resulting coating has an excellent appearance and is scuff and abrasion resistant.

A water-reducible clear paint composition is formulated as follows:

|   | Parts by Weight |
|---|---|
| Acetone | 10.0 |
| Benzyl Texanol phthalate plasticizer (described in Example 7) | 22.0 |
| Butyl benzyl phthalate | 2.0 |
| Butyl carbitol | 15.0 |
| Polymer dispersion prepared above (25.6% polymer solids) | 211.0 |
| Total | 260.0 |

The above ingredients are thoroughly blended to form a paint composition. This paint composition is reduced 100 percent by volume with a thinner of water/butyl carbitol in an 85/15 weight ratio. The diluted composition is sprayed onto a steel panel primed with a conventional alkyd primer pigmented with iron oxide and coated with a sealer and the coating is baked for 10 minutes at 95° C. and for 20 minutes at 165° C. The resulting coating has excellent mar and scratch resistance, excellent hardness, excellent gasoline resistance, a high craze-free temperature, a good appearance and good cold crack resistance.

EXAMPLE 10

|   | Parts by Weight |
|---|---|
| Portion 1 |   |
| Linseed oil fatty acids | 1145.0 |
| Pentaerythritol | 466.0 |
| Phthalic acid | 420.0 |
| Dibutyl tin oxide | 0.7 |
| Xylene Portion 2 | 105.0 |
| Toluene Portion 3 | 187.0 |
| Phthalic anhydride Portion 4 | 106.0 |
| Toluene | 1041.0 |
| Total | 3470.7 |

Portion 1 is charged into a polymerization vessel equipped with reflux condenser and a stirrer. Portion 1 is heated to its reflux temperature and reacted until the acid number is less than 10. The time for this reaction is about 3 hours and the temperature is about 200° to 250° C. Portion 2 is then added and the temperature of the reaction mixture is cooled to 160° C. Portion 3 is then added and the reaction mixture is held at 150°–160° C. for about one-half hour. Portion 4 is then added.

The resulting alkyd resin has an acid number of 24, the solution has a Gardner Holdt viscosity at 25° C. of about E and a polymer solids content of about 60.6 percent. The molecular weight of the polymer is about 4,000.

A graft copolymer having the following constituents is then prepared:

| Alkyd resin prepared above | 35.0% |
|---|---|
| 2-(1-Aziridinyl) ethyl methacrylate | 1.4% |
| Methyl methacrylate | 27.0% |
| Butyl methacrylate | 32.0% |
| Tertiary butyl amino ethyl methacrylate | 4.6% |
| Total | 100.0% |

The following ingredients are reacted to form this polymer:

|   | Parts by Weight |
|---|---|
| Portion 1 |   |
| Alkyd resin solution prepared above (60% polymer solids) | 350.0 |
| Toluene | 244.0 |
| Butanol | 70.0 |
| Portion 2 |   |
| Triethylamine | 9.0 |
| Portion 3 |   |
| N-butylmercaptane | 6.0 |
| Portion 4 |   |
| 2-(1-Aziridinyl) ethyl methacrylate | 8.4 |
| Methyl methacrylate | 162.0 |
| Butyl methacrylate | 192.0 |
| Tertiary butylaminoethyl methacrylate | 27.6 |
| Portion 5 |   |
| Acetone | 131.0 |
| Portion 6 |   |
| Azobisisobutyronitrile | 3.0 |

Portion 7

| | |
|---|---|
| Azobisisobutyronitrile | 1.5 |

Portion 8

| | |
|---|---|
| Azobisisobutyronitrile | 1.0 |

Portion 9

| | |
|---|---|
| Azobisisobutyronitrile | 1.0 |

Portion 10

| | |
|---|---|
| Azobisisobutyronitrile | 1.0 |

| | |
|---|---|
| Total | 1207.5 |

Portion 1 is charged into a reaction vessel equipped with a stirrer and a reflux condenser and thoroughly mixed. Portion 2 is charged into the reaction vessel and mixed. Portion 3 is charged into the reaction vessel and mixed. Portion 4 is charged into the reaction vessel, thoroughly mixed, and the reaction mixture is heated to its reflux temperature of about 110° C. and held at this temperature for about 1 hour. Portion 5 is charged into the reaction vessel which cools the reaction mixture to about 90° C. Portion 6 is charged into the reaction vessel, and the reaction mixture is held at about 88° C. for 45 minutes. Portion 7 is charged into the reaction vessel and the reaction mixture is held at about 88° C. for about 45 minutes. Portion 8 is then charged into the reaction vessel and the reaction mixture is held at about 88° C. for 45 minutes. Portion 9 is charged into the reaction vessel and the reaction mixture is held at about 88° C. for about 45 minutes. Portion 10 is then charged into the reaction mixture and the temperature of the reaction mixture is held at about 88° C. for an additional 45 minutes.

The resulting solution has a Gardner Holdt viscosity at 25° C. of about H, and a polymer solids content of about 49 percent. The polymer has an acid number of about 3.8 and a relative viscosity of 1.071 measured at 0.5 percent polymer solids in toluene/butanol solvent at 25° C.

A clear film is formed from the solution by brushing the solution on a glass plate and drying the coating at room temperature for about 2 hours.

A pigment dispersion is prepared as follows:

Formula 1 Pigment Dispersion

| | Parts by weight |
|---|---|
| Titanium dioxide pigment (sulfate process) | 630.0 |
| Soya Glycerol phthalate alkyd resin solution (55% resin solids in which the alkyd resin is of 43% soya oil, 52% glycerol phthalate, 5% glycerin) | 158.0 |
| Xylene | 212.0 |
| Total | 1000.0 |

The ingredients are premixed and charged into a conventional sand-grinding mill and ground to about a 0.3 mil fineness.

A paint composition is formed by mixing the following ingredients:

| | Parts by weight |
|---|---|
| Portion 1 | |
| Formula 1 Pigment Dispersion (63% titanium dioxide dispersed in the soya oil alkyd resin and hydrocarbon solvent) | 188.02 |
| Soya glycerol phthalate alkyd resin solution (55% resin solids, alkyd described in Formula 1 pigment dispersion) | 26.10 |
| Alkyd-acrylic graft copolymers solution prepared above (49% polymer solids) | 439.49 |
| Cobalt naphthanate drier solution (6% cobalt in a hydrocarbon solvent) | 2.68 |
| Manganese naphthanate drier solution (6% manganese in a hydrocarbon solvent) | 0.28 |
| Lead tallate drier solution (24% lead in a hydrocarbon solvent) | 2.68 |
| Hydrocarbon solvent (boiling point 189°-219°C., aniline point 28°C.) | 34.43 |
| Naphtha solvent (boiling point 100°-163°C.) | 79.56 |
| Portion 2 | |
| Hydrocarbon solvent (boiling point 150°-190°C., aniline point −28°C.) | 79.12 |
| Total | 852.36 |

Portion 1 is mixed for about 1 hour and then Portion 2 is added.

The above paint composition was reduced to a spray viscosity using an aromatic hydrocarbon solvent. A coating of about 2 mils thick of the paint composition was sprayed onto each of the following sets of panels: autobody steel panels which had been primed with pigmented alkyd primer; steel panels coated with an acrylic lacquer; steel panels coated with a pigmented epoxy primer; steel panels coated with a thermosetting acrylic enamel; steel panels coated with an alkyd enamel; steel panels coated with an alkyd melamine enamel. Several of the thermosetting acrylic enamel panels and the alkyd enamel panels and the alkyd melamine panels are sanded and the other panels are unsanded before the paint composition is applied. The paint is allowed to air dry for about 30 minutes and in each case, a tough, durable film having excellent gloss, adhesion and appearance is formed.

Several panels of each of the above sets are air dried for 1 week and are subjected to a high-humidity-low temperature crack test which consists of 4 cycles. In each cycle, the panels are subject to (1) 100percent relative humidity and 100° F. for 24 hours, (2) −10° F. for 24 hours and (3) room temperature for 4 hours. At the completion of each cycle, the panels are examined with a magnifying glass for cracks. At the end of the test, the above panels showed no cracking or dulling and no loss in adhesion to the substrate.

Several panels of each of the above sets are exposed in Florida at a 45° angle facing south. The panels are examined after 4 to 8 months. After 8 months of weathering, each of the panels showed good color retention, excellent gloss, very little chalking and water spotting, and no loss of adhesion to the substrate.

The above tests indicate that the novel paint composition of this invention is an excellent coating for metals and adheres to most types of substrates even under severe conditions.

EXAMPLE 11

A polyester prepolymer is prepared having the following constituents:

| | |
|---|---|
| Coconut oil | 50% |
| Ester of phthalic acid and glycerin | 47% |
| Excess phthalic anhydride | 3% |
| Total | 100% |

The polyester is prepared as follows:

| | Parts by Weight |
|---|---|
| Portion 1 | |
| Coconut oil | 1000.0 |
| Glycerin | 301.0 |
| Dibutyl tin oxide | 2.0 |
| Portion 2 | |
| Phthalic anhydride | 787.0 |
| Portion 3 | |
| Xylene | 105.0 |
| Portion 4 | |
| Toluene | 1228.0 |
| Total | 3423.0 |

Portion 1 is charged into a polymerization vessel equipped with a stirrer and a reflux condenser. Portion 1 is heated to about 232° C. and held at this temperature for 45 minutes. Portions 2 and 3 are charged into the reaction vessel and the reaction mixture is heated to a reflux temperature of about 205°–245°C. and held at this temperature for about 4 hours until an acid number of 40 is obtained. Portion 4 is then charged into the reaction mixture and the mixture is cooled to room temperature.

The resulting polymer has an acid number of 37.6, a Gardner Holdt viscosity of A, and the solution has a total solids polymer content of 57.5percent.

A graft copolymer is then prepared having the following constituents:

| | |
|---|---|
| Alkyd resin (prepared above) | 15.0% |
| 2-(1-Aziridinyl) ethyl methacrylate | 1.2% |
| Methyl methacrylate | 81.0% |
| Acrylonitrile | 2.8% |
| Total | 100.0% |

This polymer is prepared as follows:

| | Parts by Weight |
|---|---|
| Portion 1 | |
| Alkyd resin solution (prepared above) | 158.0 |
| Xylene | 80.0 |
| Butanol | 50.0 |
| Cellosolve acetate | 150.0 |
| Portion 2 | |
| Triethylamine | 8.0 |
| Portion 3 | |
| 2-(1-Aziridinyl) ethyl methacrylate | 7.2 |
| Methyl methacrylate | 486.0 |
| Acrylonitrile | 16.8 |
| Portion 4 | |
| Acetone | 135.0 |
| Portion 5 | |
| Azobisisobutyronitrile | 2.0 |
| Portion 6 | |
| Azobisisobutyronitrile | 1.0 |
| Portion 7 | |
| Azobisisobutyronitrile | 1.0 |
| Portion 8 | |
| V. M. & P-Naphtha | 285.0 |
| Mineral Spirits | 129.0 |
| Isopropyl alcohol | 70.0 |
| Portion 9 | |
| Glycol diacetate | 200.0 |
| Methylethyl ketone | 125.0 |
| Portion 10 | |
| Methylethyl ketone | 200.0 |
| Portion 11 | |
| Cellosolve Acetate | 200.0 |
| Portion 12 | |
| Methylisobutyl ketone | 100.0 |
| Total | 2404.0 |

Portion 1 is charged into a reaction vessel equipped with a stirrer and reflux condenser and thoroughly mixed. Portion 2 is charged into the reaction vessel and thoroughly mixed. Portion 3 is then charged into the reaction vessel, thoroughly mixed and the reaction mixture is heated to its reflux temperature of about 218° C. for about 1½ hours. Portion 4 is then added and the reaction mixture is cooled to about 85° C. Portion 5 is added and the reaction mixture is held at about 85° C. for about 1 hour. Portion 6 is then added and the reaction mixture is held at 85° C. for 1 hour. Portion 7 is added and the reaction mixture is held at 85° C. for 1 hour. Portions 8, 9, 10, 11 and 12 are then added and thoroughly mixed.

The resulting polymer has an acid number of 2.6 and a relative viscosity of 1.30. The polymer solution has a total solids content of about 22.9percent and a Gardner Holdt viscosity of 0.

A clear film is formed from the polymer solution by brushing the solution on a glass plate and allowing the coating to air-dry at room temperature for about 2 hours. The coating has excellent gasoline resistance.

The polymer solution is compatible with plasticizers conventionally used in auto finished and the air-drying and the baking qualities of the polymer make it particularly useful as a refinish composition. For example, the polymer is baked for about 30 minutes at 150° C. and forms a tough durable film. The polymer can be used as an internal plasticizer for conventional acrylic lacquers, and a variety of oil-modified plasticizers can be used with this polymer to formulate high-quality acrylic lacquer compositions.

EXAMPLE 12

The following polyester prepolymer is prepared: phthalic anhydride/pentaerythritol/benzoic acid/pelargonic acid in a molar ratio of 6/5/4/3.

The composition is prepared as follows:

| | Parts By Weight |
|---|---|
| Portion 1 | |
| Pelargonic acid | 399.0 |
| Benzoic acid | 411.0 |
| Phthalic anhydride | 527.0 |
| Pentaerythritol | 610.0 |
| Dibutyl tin oxide | 0.8 |
| Diisobutyl ketone | 94.0 |
| Portion 2 | |
| Xylene | 403.0 |
| Portion 3 | |
| Phthalic anhydride | 220.0 |

| | |
|---|---|
| Portion 4 | |
| Xylene | 809.0 |
| Total | 3473.8 |

Portion 1 is charged into a reaction vessel equipped with a stirrer and reflux condenser and heated to about a temperature of 170°–255°C. for about 5 hours to form a polymer. Portion 2 is charged into the reaction vessel, and the temperature of the reaction mixture is cooled to about 150° C. Portion 3 is added and the reaction mixture is held at 150° C. for about 30 minutes. Portion 4 is then added.

The following graft copolymer is prepared:

| | |
|---|---|
| Polyester prepolymer (prepared above) | 40.0% |
| 2-(1-Aziridinyl) ethyl methacrylate | 2.0% |
| Methyl methacrylate | 27.0% |
| Butyl methacrylate | 27.0% |
| Hydroxyethyl acrylate | 3.8% |

The polymers prepared by reacting the following ingredients:

| | Parts by weight |
|---|---|
| Portion 1 | |
| Alkyd resin solution (prepared above) | 334.0 |
| Xylene | 201.0 |
| Butanol | 100.0 |
| Cellosolve | 250.0 |
| Portion 2 | |
| Triethylamine | 12.0 |
| Portion 3 | |
| 2-(1-Aziridinyl) ethyl methacrylate | 11.0 |
| Methyl methacrylate | 135.0 |
| Butyl methacrylate | 135.0 |
| Portion 4 | |
| Methylisobutyl ketone | 170.0 |
| Portion 5 | |
| Acetone | 243.0 |
| Portion 6 | |
| Hydroxyethyl methacrylate | 119.0 |
| Portion 7 | |
| Azobisisobutyronitrile | 2.0 |
| Portion 8 | |
| Azobisisobutyronitrile | 1.0 |
| Portion 9 | |
| Azobisisobutyronitrile | 0.5 |
| Portion 10 | |
| Azobisisobutyronitrile | 0.5 |
| Total | 1714.0 |

Portion 1 is charged into a reaction vessel with a stirrer and reflux condenser and thoroughly mixed. Portion 2 is charged into the reaction and mixed. Portion 3 is charged into the reactor and the reaction mixture is heated to its reflux temperature from about 120° C. for about 1 hour. Portions 4 and 5 are then charged into the reaction vessel, and the temperature of the reaction mixture is cooled to about 85° C. Portions 6 and 7 are then added, and the temperature of the reaction mixture is maintained at about 85° C. for about 1 hour. Portion 8 is added and the temperature of the reaction mixture is maintained at about 85° C. for about 1 hour. Portion 9 is added and the temperature of the reaction mixture is held at 85° C. for about 1 hour. Portion 10 is added and the reaction mixture is maintained at 85° C. for an additional hour.

The resulting polymer has an acid number of 11.8 and a theoretical relative viscosity of 1.179. The polymer solution has a Gardner Holdt viscosity of 25°C. of A and a total polymer solids content of 27.9percent.

The polymer solution is diluted to a spray viscosity using conventional solvents and sprayed onto a steel panel and baked at 150° C. for 30 minutes. A clear coating is formed that is tough, durable and resistant to gasoline and ketone solvents.

This copolymer is compatible with thermosetting acrylic enamels containing melamine formaldehyde resins. This copolymer provides good metallic appearance when substituted for cellulose acetate butyrate in acrylic lacquers.

EXAMPLE 13

| | Parts by Weight |
|---|---|
| Portion 1 | |
| Xylol | 622.0 |
| Butanol | 70.0 |
| Isopropyl alcohol | 60.0 |
| Portion 2 | |
| Lauryl methacrylate | 600.0 |
| Methacrylic acid | 100.0 |
| Xylene | 215.0 |
| Isopropanol | 35.0 |
| Azo-bis-isobutyronitrile | 10.0 |
| Portion 3 | |
| Lauryl methacrylate | 216.6 |
| Methacrylic acid | 83.4 |
| Cellosolve | 100.0 |
| Azo-bis-iosbutyronitrile | 5.0 |
| Portion 4 | |
| Xylene | 100.0 |
| Butanol | 20.0 |
| Axo-bis-isobutyronitrile | 5.0 |
| Portion 5 | |
| Azo-bis-isobutyronitrile | 2.0 |
| Total | 2244.0 |

Portion 1 is charged into a polymerization vessel equipped with a reflux condenser and a stirrer. The solvent is heated to its reflux temperature which is about 105° C. While maintaining the reaction mixture at its reflux temperature, Portion 2 is slowly charged over a 30-minute period. Portion 3 is then slowly charged over a 30-minute period, while maintaining the reaction mixture at its reflux temperature. Portion 4 is divided into 5 equal parts and charged into the reaction mixture at 5-minute intervals. The reaction mixture is held at its reflux temperature for about 1 hour and then Portion 5 is charged into the reaction mixture and the mixture is held at its reflux temperature for an additional 15 minutes.

The resulting prepolymer is of lauryl methacrylate and methacrylic acid in a weight ratio of about 82/18. The polymer has an acid number of 117, and the polymer has a relative viscosity of 1.04 measured at 0.5percent polymer solids in ethylene dichloride solvent at 25° C. The solution has a polymer solids content of 43.3% and a Gardner Holdt viscosity at 25° C. of Q.

An organosol of a graft copolymer then is prepared according to the following procedure by polymerizing in solution and precipitating to form an organosol by the addition of an aliphatic hydrocarbon solvent and alcohol mixture.

| | Parts by Weight |
|---|---|
| Portion 1 | |
| Prepolymer solution prepared above (43.3% polymer solids) | 167.00 |
| Xylene | 170.00 |
| Butanol | 50.00 |
| Cellosolve | 55.00 |
| Hydroquinone | 0.03 |
| Triethylamine | 3.00 |
| Portion 2 | |
| 2-(1-Aziridinyl)ethyl methacrylate | 2.40 |
| Methyl methacrylate | 498.00 |
| Acrylonitrile | 27.60 |
| Portion 3 | |
| Acetone | 152.00 |
| Portion 4 | |
| Azobisisobutyronitrile | 1.50 |
| Portion 5 | |
| Azobisisobutyronitrile | 1.00 |
| Portion 6 | |
| Azobisisobutyronitrile | 1.00 |
| Portion 7 | |
| Azobisisobutyronitrile | 2.00 |
| Portion 8 | |
| Aliphatic hydrocarbon solvent V.M. and P-Naphtha solvent | 603.00 |
| Butanol | 120.00 |
| Total | 1853.53 |

Portion 1 is charged into a polymerization equipped with a reflux condenser and stirrer and thoroughly mixed. Portion 2 is premixed and charged into the polymerization vessel. The reaction mixture is heated to its reflux temperature, and is held at its reflux temperature for 1½ hours. Portion 3 is charged into the reaction vessel and the temperature is cooled to about 82° C. Portion 4 is then added and the reaction mixture is heated to its reflux temperature and held at this temperature for 1½ hours. Portion 5 is added and the reaction mixture is held at reflux for an additional hour. Portion 6 is added and the reaction mixture is held at the reflux temperature for 45 minutes and Portion 7 is then added and also held for 45 minutes. Portion 8 is premixed and added while the reaction mixture is being mixed. Portion 8 converts the reaction mixture from a solution to an organosol.

The resulting organosol has a total solids content of 31.1 percent and a Gardner Holdt viscosity at 25° C. of D. The polymer of the organosol has an acid number of 12.3 and a relative viscosity of 1.199 measured at 0.5 polymer solids in an ethylene dichloride at 25° C.

An organosol lacquer composition is then formulated from the above prepared organosol:

| | Parts by Weight |
|---|---|
| Portion 1 | |
| Organosol prepared above (32% polymer solids) | 238 |
| Portion 2 | |
| Plasticizer (prepared from adipic acid, neopentyl glycol and benzoic acid 60% polymer solids in toluene) | 40 |
| Ethylene glycol diacetate/cellosolve acetate | 12 |
| Portion 3 | |
| Solvent blend cyclohexane/ethylene glycol diacetate/cellosolve acetate (weight ratio 40/30/30) | 124 |
| Total | 414 |

Portion 2 is premixed and added to Portion 1 in a mixing vessel and then Portion 3 is added to Portions 1 and 2 and the blend is thoroughly mixed. The film is then sprayed onto a metal panel suitably primed and also to a glass panel. The films are baked for 30 minutes at 150° C. The film thickness is about 2 mils. The resulting film has excellent clarity, a Knoop hardness of 12.5 and has good gasoline resistance.

EXAMPLE 14

In the Example, an organosol is prepared directly in the polymerization process:

| | Parts by Weight |
|---|---|
| Portion 1 | |
| Copolymer of lauryl methacrylate/ methacrylic acid, weight ratio about 82/18 (43.3% polymer solids, prepared in Example 1) | 167.00 |
| Aliphatic hydrocarbon solvent | 200.00 |
| Butanol | 102.00 |
| Hydroquinone | 0.03 |
| Triethylamine | 3.00 |
| Portion 2 | |
| 2-(1 Aziridinyl)ethyl methacrylate | 2.40 |
| Methyl methacrylate | 498.00 |
| Acrylonitrile | 27.60 |
| Cyclohexane | 200.00 |
| Portion 3 | |
| Azobisisobutyronitrile | 1.50 |
| Portion 4 | |
| Azobisisobutyronitrile | 1.00 |
| Portion 5 | |
| Azobisisobutyronitrile | 1.00 |
| Portion 6 | |
| Azobisisobutyronitrile | 1.00 |
| Portion 7 | |
| Azobisisobutyronitrile | 2.00 |
| Total | 1206.53 |

Portion 1 is charged into a polymerization vessel equipped with a stirrer and a reflux condenser. Portion 2 is then charged into the reaction vessel and the reaction mixture is heated to its reflux temperature and held at this temperature for 1½ hours. Portion 3 is then added and the temperature is lowered to about 82° C. Portion 4 is then added and the reaction mixture is heated to its reflux temperature and held at this temperature for 1½ hours. Portion 5 is then added and the reaction mixture is held at its reflux temperature for an additional hour. Portion 6 is then added and the reaction mixture is held at its reflux temperature for an additional 45 minutes. Portion 7 is then added and the reaction mixture is held at its reflux temperature for an additional 45 minutes.

The resulting organosol dispersion has a milky white appearance and a total solids content of 51.0 percent and the polymer has an acid number of 12.4 and a relative viscosity of 1.287 measured at 0.5 percent polymer solids in ethylene dichloride at 25° C.

An organosol lacquer composition is prepared as in Example 1 using the identical solvents, except the above prepared organosol is substituted for the organosol used in Example 1. The resulting lacquer has the same physical properties as the organosol of Example 1. Films are formed on primed metal panels and on glass panels as in Example 1 and have properties which are similar to those of the lacquer films of Example 1.

EXAMPLE 15

|  | Parts by Weight |
|---|---|
| Portion 1 | |
| Copolymer solution (prepared in Example 1) | 167.00 |
| Xylene | 200.00 |
| Butanol | 102.00 |
| Hydroquinone | 0.03 |
| Triethylamine | 3.00 |
| Portion 2 | |
| 2-(1-Aziridinyl)ethyl methacrylate | 2.40 |
| Methacrylonitrile | 525.60 |
| Portion 3 | |
| Cyclohexane | 135.00 |
| Portion 4 | |
| Azobisisobutyronitrile | 1.50 |
| Portion 5 | |
| Azobisisobutryonitrile | 4.00 |
| Total | 1140.53 |

Portion 1 is charged into a reaction vessel equipped with a stirrer and reflux condenser and thoroughly mixed. Portion 2 is then added and the reaction mixture is heated to its reflux temperature and held at this temperature for 1½ hours. Portion 3 is then added and the temperature of the reaction mixture is reduced to 77° C. Portion 4 is then added and held at its reflux temperature for 1½ hours. Portion 5 is divided into four equal parts and added at 1 hour intervals while maintaining the reaction mixture at its reflux temperature.

The resulting organosol dispersion has a milky white appearance and a total polymer solids of 52.5 percent. The polymer has an acid number of 12.2 and a relative viscosity of 2.220 measured at 0.5 percent polymer solids in dimethyl formamide at 25° C. The dispersion was dissolved in dimethyl formamide and a film was cast on metal substrate and baked for 30 minutes at 150° C. A tough solvent resistant film resulted which can be used as an exterior coating on automobiles and trucks.

EXAMPLE 16

A prepolymer is prepared by reacting the following ingredients:

|  | Parts by Weight |
|---|---|
| Portion 1 | |
| Xylene | 1100 |
| Butanol | 193 |
| Portion 2 | |
| Lauryl methacrylate | 500 |
| 2-Ethylhexylacrylate | 640 |
| Methacrylic acid | 300 |
| Tertiary butyl peracetate solution (75% solids solution in mineral spirits) | 20 |
| Portion 3 | |
| Lauryl methacrylate | 260 |
| 2-Ethylhexylacrylate | 160 |
| Methacrylic acid | 140 |
| Tertiary butyl peracetate solution (described above) | 20 |
| Portion 4 | |
| Butanol | 302 |
| Portion 5 | |
| Xylene | 365 |
| Total | 4000 |

Portion 1 is charged into a polymerization vessel equipped with a stirrer and a reflux condenser, and heated to its reflux temperature which is about 120° C. Portion 2 is then slowly added over a 1 hour period while maintaining the reaction mixture and its reflux temperature which is about 125° C. Portion 3 is then slowly added over a 1 hour period while the reaction mixture is maintained at reflux temperature. The reaction mixture is held at reflux temperature for an additional 1½ hours and Portions 4 and 5 are then added.

The resulting polymer has an acid number of 135. The polymer solution has a polymer solids content of 48.8 percent and a Gardner Holdt viscosity of 25° C. of $Z_1$.

A graft copolymer is then prepared from the above prepolymer composition by reaction the following ingredients:

|  | Parts by Weight |
|---|---|
| Portion 1 | |
| Prepolymer solution prepared above (48.8% solids) | 411.0 |
| Xylene | 50.0 |
| Cellosolve | 100.0 |
| Cellosolve acetate | 217.0 |
| Portion 2 | |
| Triethylamine | 10.0 |
| Portion 3 | |
| 2-(1-Aziridinyl) ethyl methacrylate | 7.0 |
| Methyl methacrylate | 750.0 |
| Acrylonitrile | 43.0 |
| Portion 4 | |
| Acetone | 230.0 |
| Portion 5 | |
| Azobisisobutyronitrile | 3.5 |
| Portion 6 | |
| Azobisisobutyronitrile | 1.5 |
| Solvent mixture of V.M. and P-Naphtha/mineral spirits/isopropyl alcohol (weight ratio of 66/28.4/5.6) | 150.0 |
| Portion 7 | |
| Azobisisobutyronitrile | 1.5 |
| Solvent mixture (described above) | 100.0 |
| Portion 8 | |
| Azobisisobutyronitrile | 1.5 |
| Solvent mixture (described above) | 100.0 |
| Portion 9 | |
| Azobisisobutyronitrile | 1.0 |
| Solvent mixture (described above) | 100.0 |
| Portion 10 | |
| Solvent mixture (described above) | 1065.0 |
| Total | 3342.0 |

Portion 1 is charged into a reaction vessel equipped with a stirrer and a reflux condenser. Portion 2 is then added and thoroughly mixed. Portion 3 is added and the reaction mixture is heated to its reflux temperature which is about 105° C. and held at this temperature for 1½ hours. Portion 4 is then added which cools the reaction mixture to about 80° C. Portion 5 is then added and the reaction is held at about 80°C. for about 1 hour. Portion 6 is added and the reaction mixture is held at about 80° C. for an additional hour. Portion 7 is added and the reaction mixture is held at 80° C. for 45 minutes. Portion 8 is then added and the reaction mixture is held at 80° C. for an additional 45 minutes. Portion 9 is then added and the reaction mixture is held at 80° C. for an additional one-half hour. Portion 10 is then added.

The resulting product is an organosol having a polymer solids content of 29.1 percent and a Gardner Holdt viscosity at 25° C. of about J. The polymer has an acid number of 24.4.

A mill base is prepared by blending the following ingredients:

| | Parts by Weight |
|---|---|
| Portion 1 | |
| Organosol (prepared above) | 50 |
| Ethylene glycol diacetate | 21 |
| Cellosolve acetate | 15 |
| Xylene | 69 |
| Portion 2 | |
| Titanium dioxide pigment (Rutile pigment) | 347 |
| Xylene | 60 |
| Total | 562 |

Portion 1 is charged into a mixer and is thoroughly blended. Portion 2 is then added and the mixture is thoroughly blended for 30 minutes. The mixture is then charged into a conventional sand mill and ground to a 0.1 mill fineness.

An organosol lacquer is prepared by blending the following ingredients:

| | Parts by Weight |
|---|---|
| Mill base (prepared above) | 230 |
| Polymer dispersion (prepared above) | 130 |
| V. M. & P-Naphtha | 72 |
| Total | 432 |

This organosol lacquer is diluted to a Zahn cup viscosity of 40 seconds at 25° C. by blending the following ingredients: about 100 parts of the above lacquer are blended with 41 parts of the following solvent blend:

| | |
|---|---|
| Butyl cellosolve acetate | 54.40% |
| Ethylene glycol diacetate | 8.24% |
| Butylbenzyl phthalate | 1.09% |
| V. M. & P-Naphtha | 36.27% |

The above diluted organosol lacquer is sprayed onto a steel panel primed with a high pigment volume primer surfacer which has been sanded to a smooth surface. The panel is baked at 165° C. for about 30 minutes. The resulting coating is about 2.5 mils thick. The film has an excellent gloss and appearance. A second coat is applied and baked as above. Two coats adequately cover the panel and the resulting panel has an excellent gloss and appearance, excellent solvent resistance, particularly to gasoline, and has excellent water spot resistance and craze resistance. A two-coat system of this composition can be utilized as a topcoat for automobiles and trucks.

We claim:

1. A process for forming a graft copolymer having a backbone segment and side chain segments which comprises the following steps:

1. preparing a prepolymer which forms the side chain segments of said graft copolymer by polymerizing monomer units at about 50°—260°C. for about 0.5—6.0 hours to form a prepolymer that has a number average molecular weight of about 500—150,000 and at least one reactive group selected from the group consisting of

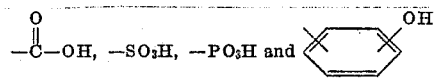

and wherein the prepolymer is selected from the group consisting of acrylic polymers, epoxy ester resins, polyesters, alkyd resins, polyethylene, polypropylene, polybutylene, polychloroprene, polyethylene/vinyl acetate, polyvinyl chloride, polyvinylidene chloride, polystyrene, polytetrafluoroethylene, polyamides, polyimides, polyamide-imide, and polyurethanes;

2. reacting said prepolymer with an aziridinyl compound of the formula

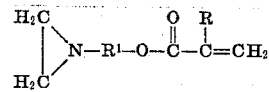

wherein the reactive group of the prepolymer reacts with the aziridinyl ring to form a prepolymer having one ethylenically unsaturated site and wherein —R is selected from the group consisting of —H and —CH₃ and R¹ is an alkylene group having one to eight carbon atoms;

3. polymerizing the prepolymer formed in step (2) with ethylenically unsaturated monomer units at about 75°–260° C. for about 2—6.0 percent by weight of side chain segments and correspondingly 9–10 percent by weight of backbone segment having a number average molecular weight of about 5,000–200,000 wherein the polymerized ethylenically unsaturated monomer units form the backbone segment of the graft copolymer and the side chain segment of the graft copolymer is coupled into the backbone segment through the polymerization of the ethylenically unsaturated site; and wherein the ethylenically unsaturated monomer units of the backbone are selected from the group consisting of ethylene, propylene, butylene, ethylene/vinyl acetate, vinyl chloride, vinylidene chloride, tetrafluoroethylene, fluorinated ethylenepropylene, styrene, styrene/butadiene, acrylonitrile, methacrylonitrile, acrylamide and alkyl esters of acrylic and methacrylic acid in which the alkyl group has one to 24 carbon atoms.

2. The process of claim 1 in which a basic compound is added to the prepolymer to neutralize at least one reactive group of the prepolymer before the prepolymer is reacted with the aziridinyl compound in step (2).

3. The process of claim 2 in which the prepolymer in step 1 is prepared using azocyanopentanoic acid to form a prepolymer having one reactive carboxyl group.

4. A process for forming a graft copolymer having a backbone segment and side chain segments which comprises the following steps:
   1. preparing a prepolymer which forms the side chain segment of the graft copolymer by polymerizing monomer units at about 50°—200° C. for about 0.5—6 hours utilizing a polymerization catalyst and forming a prepolymer having a number average molecular weight of about 500–150,000 and each mole of prepolymer containing at least one reactive carboxyl group wherein the prepolymer is selected from the group consisting of acrylic polymers, epoxy ester resins, polyesters, alkyd resins, polyethylene, polypropylene, polybutylene, polychloroprene, polyethylene/vinyl acetate, polyvinyl chloride, polyvinylidene chloride, polystyrene, polytetrafluoroethylene, polyamides, polyimides, polyamide-imide, and polyurethanes;
   2. neutralizing the carboxyl group of the prepolymer with a basic compound that volatilizes below about 110°C.;
   3. reacting said prepolymer with

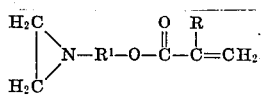

to form a prepolymer having an ethylenically unsaturated site, wherein —R is selected from the group consisting of —H and —CH$_3$; and
   4. polymerizing the prepolymer formed in step (3) with ethylenically unsaturated monomer units at about 75°–260° C. for about 2–6 hours using a polymerization catalyst to form a graft copolymer having a number average molecular weight of about 20,000—200,000 and wherein the ethylenically unsaturated monomer units of the backbone are selected from the group consisting of ethylene, propylene, butylene, ethylene/vinyl acetate, vinyl chloride, vinylidene chloride, tetrafluoroethylene, fluorinated ethylene-propylene, styrene, styrene/butadiene, acrylonitrile, methacrylonitrile, acrylamide and alkyl esters of acrylic and methacrylic acid in which the alkyl group has one to 24 carbon atoms.

5. The process of claim 4 in which the molar ratio of the basic compound to the carboxyl equivalent of prepolymer to aziridinyl compound is maintained at about 1:1:1.

6. The process of claim 5 in which acrylic monomer units are used in step (4) for the backbone segment of the graft copolymer.

7. The process of claim 6 in which the monomer units used for the prepolymer are acrylic monomer units.

8. The process of claim 6 in which the resulting prepolymer is an epoxy ester and the monomer units for the prepolymer are an epoxy hydroxy polyether resin and a polycarboxylic acid.

9. The process of claim 6 in which the resulting prepolymer is an alkyd resin and the monomer units for the prepolymer are a polyhydric alcohol, a fatty acid and a polybasic acid.

10. The process of claim 5 in which the monomer units for the backbone are selected from the group consisting of alkyl acrylate, alkyl methacrylate, styrene, acrylonitrile, methacrylonitrile, wherein the alkyl groups contain one to 24 carbon atoms.

11. A process for forming a graft copolymer having a backbone segment and side chain segments which comprises the following steps:
   1. preparing a prepolymer which forms the side chain segment of said graft copolymer by polymerizing monomer units at about 50–260° C. to about 0.5–6.0 hours to form a prepolymer that has a number average molecular weight of about 500–150,000 and one reactive carboxyl group wherein the prepolymer is selected from the group consisting of acrylic polymers, epoxy ester resins, alkyd resins, polyesters and polyurethanes;
   2. polymerizing ethylenically unsaturated monomer units that form the backbone of the graft copolymer at about 75°–260° C. for about 2—6.0 hours with an aziridinyl compound of the formula

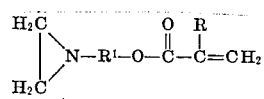

to form a polymer segment having pendent aziridinyl groups;
   wherein R$^1$ is an alkylene radical having one to eight carbon atoms;
   —R is selected from the group consisting of —H and —CH$_3$;
   wherein the monomer units for the backbone are selected from the group consisting of alkyl acrylate, an alkyl methacrylate, styrene, acrylonitrile, methacrylonitrile, wherein the alkyl groups contain one to 24 carbon atoms; and
   3. reacting the aziridinyl group of polymer segment of step (2) with the reactive group of the prepolymer of step (1) at about 50°–260° C. for about 0.5–6.0 hours to form a graft copolymer having a number average molecular weight of about 5,000–200,000.

12. The process of claim 11 in which the prepolymer is prepared utilizing 1 mole of azocyanopentanoic acid per mole of prepolymer to form a prepolymer with a reactive carboxyl group.

* * * * *